US012278071B2

(12) United States Patent
Lim

(10) Patent No.: US 12,278,071 B2
(45) Date of Patent: Apr. 15, 2025

(54) CROSSBAR ASSEMBLY AND TRIP ASSEMBLY COMPRISING SAME

(71) Applicant: LS ELECTRIC CO., LTD., Anyang-si (KR)

(72) Inventor: Jeongjae Lim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 480 days.

(21) Appl. No.: 17/756,063

(22) PCT Filed: Apr. 9, 2020

(86) PCT No.: PCT/KR2020/004813
§ 371 (c)(1),
(2) Date: May 16, 2022

(87) PCT Pub. No.: WO2021/100984
PCT Pub. Date: May 27, 2021

(65) Prior Publication Data

US 2022/0406550 A1 Dec. 22, 2022

(30) Foreign Application Priority Data

Nov. 18, 2019 (KR) ........................ 10-2019-0147947

(51) Int. Cl.
*H01H 71/12* (2006.01)
*H01H 71/02* (2006.01)
*H01H 71/24* (2006.01)

(52) U.S. Cl.
CPC ........ *H01H 71/128* (2013.01); *H01H 71/025* (2013.01); *H01H 71/2472* (2013.01)

(58) Field of Classification Search
CPC ............... H01H 71/128; H01H 71/025; H01H 71/2472; H01H 71/7418; H01H 71/402;
(Continued)

(56) References Cited

U.S. PATENT DOCUMENTS 4,724,411 A * 2/1988 Matsumoto ........ H01H 71/1009 335/10
2017/0243710 A1 8/2017 Oh

FOREIGN PATENT DOCUMENTS

CN 105679614 A 6/2016
CN 106252177 A 12/2016
(Continued)

OTHER PUBLICATIONS

Office Action for related Japanese Application No. 2022-526763; action dated May 23, 2023; (3 pages).
(Continued)

*Primary Examiner* — Mohamad A Musleh
(74) *Attorney, Agent, or Firm* — K&L Gates LLP

(57) ABSTRACT

A crossbar assembly and a trip assembly comprising same are disclosed. The crossbar assembly according to an embodiment of the present disclosure comprises a crossbar and an instant bar. The crossbar and the instant bar can be rotatably coupled so as to be rotatable around the same rotary shaft. Therefore, the space required for rotation can be reduced to be less than when the crossbar and the instant bar are individually rotated. In addition, the crossbar can move in a longitudinal direction when coupled to the instant bar. Therefore, a metallic bar for movement of the crossbar is unnecessary. Therefore, interference between different-phase currents flowing through the trip assembly can be minimized.

15 Claims, 22 Drawing Sheets

(58) Field of Classification Search
CPC ............... H01H 71/40; H01H 71/7436; H01H 71/7445; H01H 71/12
See application file for complete search history.

(56) References Cited

FOREIGN PATENT DOCUMENTS

| | | | | |
|---|---|---|---|---|
| EP | 0208292 | A2 | * | 1/1987 |
| JP | H05334951 | A | | 12/1993 |
| JP | 2000003655 | A | | 1/2000 |
| JP | 3246560 | B2 | | 1/2002 |
| JP | 2006012532 | A | | 1/2006 |
| JP | 2009230890 | A | | 10/2009 |
| JP | 2010135306 | A | | 6/2010 |
| KR | 200156757 | | | 6/1999 |
| KR | 20030012993 | A | | 2/2003 |
| KR | 100390459 | B1 | | 7/2003 |
| KR | 100652236 | B1 | * | 12/2006 |
| KR | 20170076870 | A | * | 7/2017 |
| KR | 1020170076870 | A | | 7/2017 |
| KR | 1020170076874 | A | | 7/2017 |
| KR | 20170098627 | A | | 8/2017 |

OTHER PUBLICATIONS

Partial Supplementary Search Report for related European Application No. 20890261.9; action dated Feb. 12, 2024; (11 pages).
International Search Report for related International Application No. PCT/KR2020/004813; report dated May 27, 2021; (5 pages).
Written Opinion for related International Application No. PCT/KR2020/004813; report dated May 27, 2021; (4 pages).
Notice of Allowance for related Korean Application No. 10-2019-0147947; action dated Jun. 10, 2021; (2 pages).
Office action for related Korean Application No. 10-2019-0147947; action dated Dec. 22, 2020; (3 pages).
Extended European Search Report for related Application No. 20890261.9; action dated May 28, 2024; (12 pages).
Office Action for related Chinese Application No. 202080075078.3; action dated Jul. 19, 2024; (8 pages).
Notice of Allowance for related Chinese Application No. 202080075078.3; action dated Jul. 19, 2024; (8 pages).

* cited by examiner

CROSSBAR ASSEMBLY AND TRIP ASSEMBLY COMPRISING SAME

CROSS-REFERENCE TO RELATED APPLICATIONS

This application is the National Stage filing under 35 U.S.C. 371 of International Application No. PCT/KR2020/004813, filed on Apr. 9, 2020, which claims the benefit of earlier filing date and right of priority to Korea utility model Application No. 10-2019-0147947 filed on Nov. 18, 2019, the contents of which are all hereby incorporated by reference herein in their entirety.

FIELD

The present disclosure relates to a crossbar assembly and a trip device including the same, and more particularly, to a crossbar assembly having a structure capable of securing a space by integrating a crossbar and an instant bar, and a trip device including the same.

BACKGROUND

A Molded Case Circuit Breaker (MCCB) is provided on a wiring to automatically break a circuit when an electrical overload condition or a short-circuit accident occurs. Accordingly, damages on circuits and loads connected to the wiring due to an electrical accident can be prevented.

The MCCB has a trip assembly (or trip device). The trip device performs a trip operation of the opening/closing mechanism when the overload condition or a short-circuit accident occurs. The trip device is movably coupled to the MCCB.

The trip device is coupled to a movable contactor, so that the movable contactor can move together with the trip device. When the trip device moves, the movable contactor is brought into contact with or separated from a fixed contactor. Accordingly, the MCCB can be electrically connected to or disconnected from outside.

Situations for the trip device to perform a trip operation may be broadly classified into two types.

First, the trip device may perform a trip operation when an overcurrent flows in the MCCB. When an overcurrent flows, a crossbar provided in the trip device may be rotated to perform the trip operation.

Next, the trip device may perform a trip operation when a fault current flows in the MCCB. When a fault current flows, an instant bar provided in the trip device may be rotated to perform the trip operation.

Referring to FIGS. 1 and 2, a trip device 1000 according to the related art is illustrated.

When a normal current flows, a shooter hook 1110 of a shooter 1100 is locked by being brought into contact with a crossbar hook 1210 of a crossbar 1200. Accordingly, the shooter 1100 is not rotated, and thus a trip operation is not performed.

The crossbar 1200 is rotatably provided. When an overcurrent or a fault current flows, the crossbar 1200 is rotated counterclockwise in FIG. 1. Accordingly, the shooter hook 1110 and the crossbar hook 1210 are separated from each other, the shooter 1100 is rotated, and a trip operation is performed.

The crossbar 1200 may be rotated under specific conditions. The conditions may be controlled by the crossbar 1200 and an instant bar 1300, respectively.

That is, a magnitude of a fault current causing the rotation of the crossbar 1200 may be adjusted by the instant bar 1300 and a magnetic part 1400. When a fault current flows, an electromagnet 1410 is magnetized and an armature 1420 is moved.

At this time, since the armature 1420 is connected to the instant bar 1300 through an elastic body, the instant bar 1300 is also moved and hits the crossbar 1200. Accordingly, a reference fault current may be adjusted by adjusting an elastic force of the elastic body.

In addition, a magnitude of an overcurrent causing the rotation of the crossbar 1200 may be adjusted by a distance between the crossbar 1200 and a bimetal 1500. That is, when an overcurrent occurs, the bimetal 1500 is curved toward the crossbar 1200 to hit the crossbar 1200.

Accordingly, the magnitude of the overcurrent for performing a trip operation may be adjusted by adjusting the distance between the bimetal 1500 and the crossbar 1200. This may be adjusted by the movement of the crossbar 1200 in a longitudinal direction, in response to rotation of a dial 1600.

However, the trip device 1000 according to the related art includes the crossbar 1200 and the instant bar 1300, respectively. That is, the crossbar 1200 and the instant bar 1300 are spaced apart from each other and rotated centering on separate rotation shafts.

Therefore, an excessive space for the rotation of the crossbar 1200 and the instant bar 1300 is required.

In addition, a bar made of a metal material that serves as the rotation shaft is provided in order to move the crossbar 1200 according to the rotation of the dial 1600. However, the bar is arranged to cross between a plurality of frames through which currents of different phases flow. The bar may be likely to cause interference between the currents of different phases.

Korean Registration Utility Model No. 20-0156757 discloses an instantaneous trip temporary adjustment device for a molded case circuit breaker. Specifically, the patent document discloses an instantaneous trip temporary adjustment device having a structure capable of simplifying a structure by rotating an instantaneous value setting dial to adjust tensile force of a spring.

However, this type of instantaneous trip temporary adjustment device can simplify the structure of a transmission member between the adjustment dial and the spring, but fails to suggest a structure related to the rotation of a crossbar and an instant bar. The instantaneous trip temporary adjustment device of the structure also fails to suggest a method for excluding the metal bar disposed in the crossbar.

Korean Patent Publication No. 10-2017-0076874 discloses a magnetic type trip device of an MCCB. Specifically, the patent document discloses a trip device having a structure capable of preventing an electrical connection between a plurality of conductors by using a base structure having insulating partitions that partition a plurality of insulating spaces accommodating the plurality of conductors.

However, this type of trip device does not suggest a method for excluding a metal bar disposed to cross the insulating spaces accommodating the conductors, respectively. In addition, the prior art document also fails to suggest a method for reducing a space in which a crossbar and an instant bar are rotated.

Korean Registration Utility Model No. 20-0156757 (Sep. 1, 1999)

Korean Patent Publication No. 10-2017-0076874 (Jul. 5, 2017)

SUMMARY

The present disclosure describes a crossbar assembly of a structure capable of solving those problems, and a trip device having the same.

First, the present disclosure describes a crossbar assembly having a structure capable of miniaturizing a space in which a crossbar and an instant bar are rotated, and a trip device including the same.

The present disclosure also describes a crossbar assembly having a structure capable of improving arc extinguishing ability generated when a trip device operates, and a trip device including the same.

The present disclosure further describes a crossbar assembly having a structure capable of facilitating coupling and separation between a crossbar and an instant bar, and a trip device including the same.

The present disclosure further describes a crossbar assembly having a structure capable of preventing an arbitrary separation when a crossbar and an instant bar are coupled to each other, and a trip device including the same.

The present disclosure further describes a crossbar assembly having a structure capable of easily adjusting a trip section between a crossbar and an instant bar, and a trip device including the same.

The present disclosure further describes a crossbar assembly having a structure capable of easily limiting a relative movement distance between a crossbar and an instant bar, and a trip device including the same.

The present disclosure further describes a crossbar assembly having a structure capable of preventing an occurrence of electrical interference between currents of various phases, and a trip device including the same.

In order to achieve those aspects and other advantages of the subject matter disclosed herein, there is provided a crossbar assembly that may include a crossbar extending in one direction, and an instant bar extending in the one direction and rotatably coupled to the crossbar. The crossbar may include an insertion space portion formed through an inside of the crossbar in the one direction, accommodating the instant bar, and having one side facing the instant bar open, a first body portion extending in the one direction and surrounding a part of the insertion space portion, and a second body portion extending in the one direction and surrounding another part of the insertion space portion.

Each of the first body portion and the second body portion of the crossbar assembly may have an arcuate cross-section. One end portion of the first body portion in an arcuate direction and one end portion of the second body portion in the arcuate direction may be spaced apart from each other at the one side at which the insertion space portion is open.

A cross-section of the first body portion and a cross-section of the second body portion of the crossbar assembly may be formed in an arcuate shape having the same center.

The instant bar of the crossbar assembly may include an instant bar body part extending in the one direction, rotatably inserted into the insertion space portion, and having a rounded outer circumferential surface. Also, the instant bar body part may be formed such that a minimum distance from a central axis in the extending direction to the outer circumferential surface is longer than a distance between the one end portion of the first body portion and the one end portion of the second body portion.

The first body portion of the crossbar of the crossbar assembly may include a movement limiting groove formed therethrough and extending by a predetermined length in the one direction, and the instant bar body part facing the crossbar may include a movement limiting protrusion protruding from one side thereof toward the crossbar and inserted through the movement limiting groove.

The movement limiting protrusion of the crossbar assembly may include a first portion extending from the outer circumferential surface of the one side of the instant bar body part to form a predetermined angle with the outer circumferential surface of the one side, and a second portion extending from an end of the first portion to form a predetermined angle with the first portion.

The instant bar of the crossbar assembly may be coupled to the crossbar to be movable in the one direction.

An extended length of the instant bar of the crossbar assembly may be shorter than an extended length of the crossbar.

In order to achieve those aspects and other advantages of the subject matter disclosed herein, there is provided a trip device that may include a frame with an inner space, a shooter rotatably coupled to the frame, and a crossbar assembly rotatably coupled to the frame to be brought into contact with or separated from the shooter. The crossbar assembly may include a crossbar extending in one direction and including an insertion space portion formed through an inside thereof in the one direction, and an instant bar extending in the one direction and rotatably coupled to the insertion space portion of the crossbar.

The instant bar of the trip device may include a rotation shaft located on each end portion of the instant bar in the extending direction and rotatably coupled to the frame.

The crossbar of the trip device may include a shooter contact part protruding toward the shooter, and a contact hook portion extending from an end portion of the shooter contact part toward the shooter while forming a predetermined angle with the shooter contact part. The shooter may include a shooter hook portion brought into contact with the contact hook portion and extending toward the shooter contact part.

The crossbar of the trip device may include a first body portion extending in the one direction and surrounding a part of the insertion space portion, and a second body portion extending from the first body portion in the one direction and surrounding another part of the insertion space portion. The second body portion may extend to be shorter than the first body portion, and may be provided in plurality. The plurality of second body portions may be spaced apart from one another by predetermined distances.

The instant bar of the trip device may include an elastic member coupling part having a coupling groove to which the elastic member is coupled, and protruding from the instant bar, and the elastic member coupling part may be inserted into a movement groove that is a space defined between the plurality of second body portions.

The instant bar of the trip device may be coupled to the crossbar to be movable relative to the crossbar in the one direction or in another direction opposite to the one direction, and the elastic member coupling part may be moved in the one direction or the another direction between an end portion in the one direction of any one second body portion of adjacent second body portions and an end portion in another direction of the second body portion.

The crossbar of the trip device may include a movement limiting groove formed through an outer circumferential surface thereof by a predetermined distance in the one direction in which the crossbar extends, and the instant bar may include a movement limiting protrusion protruding toward the movement limiting groove and coupled through the movement limiting groove.

According to the present disclosure, the following effects can be achieved.

First, a crossbar and an instant bar may be arranged to have the same rotation shaft. The crossbar and the instant bar may be rotatably coupled to each other. The rotation of the crossbar and the rotation of the instant bar may not affect each other.

Therefore, a space for rotating the crossbar and a space for rotating the instant bar can be integrated with each other. This can decrease a space to be secured for the rotation of the crossbar and the instant bar and minimize sizes of a trip device and a circuit breaker.

In addition, a decrease in the space for the rotation of the crossbar and the instant bar by such a configuration can cause an increase in a space to be occupied by a generated arc.

Therefore, the arc can be cooled and extinguished for a sufficient time before it is discharged from the circuit breaker. This can improve an arc extinguishing ability of the circuit breaker.

The crossbar and the instant bar can be detachably coupled so as to configure a crossbar assembly. A first body portion and a second body portion of the crossbar may be formed of a material that is deformable in a predetermined shape. After the first body portion and the second body portion are deformed when the instant bar is inserted, those body portions can be restored to their original shapes once the instant bar is inserted.

When the instant bar is separated from the crossbar assembly, the first body portion and the second body portion of the crossbar may be deformed and then restored to their original shapes once the instant bar is separated.

This can facilitate the coupling and separation between the crossbar and the instant bar.

The crossbar may include a movement limiting groove formed therethrough. The instant bar may include a movement limiting protrusion protruding therefrom to be inserted through the movement limiting groove. The movement limiting protrusion may include a first portion extending at a predetermined angle with an instant bar body part, and a second portion extending at a predetermined angle with the first portion.

Accordingly, in order for the instant bar to be separated from the crossbar, the instant bar must be rotated a plurality of times so that the second portion and the first portion are separated without being caught. This can prevent an arbitrary separation of the instant bar coupled to the crossbar.

The crossbar may be coupled to the instant bar to be movable in an extending direction. Since the instant bar is rotatably coupled to a frame, it may not be moved regardless of the movement of the crossbar. When the crossbar is moved in the extending direction, a bimetal contact part provided on the crossbar may also be moved in the extending direction.

One side surface of a bimetal facing the bimetal contact part may be inclined in the extending direction. Accordingly, when the crossbar is moved in the extending direction, a distance between the bimetal contact part and the bimetal can be adjusted.

Therefore, a trip section can be easily adjusted merely by moving the crossbar in the extending direction.

The crossbar may include a movement limiting groove formed therethrough. The instant bar may include a movement limiting protrusion protruding therefrom to be inserted through the movement limiting groove. The movement limiting groove may extend by a predetermined length in the extending direction of the crossbar.

When the crossbar is moved in the extending direction, the movement limiting groove may also be moved in the extending direction. In this case, since the instant bar is not moved, the movement limiting protrusion may not be moved as well. Therefore, when the crossbar is moved by a predetermined distance, a surface of the crossbar surrounding the movement limiting groove may be brought into contact with the movement limiting protrusion.

Meanwhile, the crossbar may include a movement groove. An elastic member coupling part may protrude from the instant bar to be inserted into the movement groove. The movement groove may extend by a predetermined length in the extending direction of the crossbar.

When the crossbar is moved in the extending direction, the movement groove may also be moved in the extending direction. In this case, since the instant bar is not moved, the elastic member coupling part may not be moved as well. Accordingly, when the crossbar is moved by a predetermined distance, the second body portion surrounding the movement groove may be brought into contact with the elastic member coupling part.

This can result in easily limiting a maximum distance by which the crossbar is moved in the extending direction.

The crossbar may be inserted into the instant bar to be movable in the extending direction. That is, the instant bar may function as a guide when the crossbar is moved in the extending direction. Accordingly, a separate member for guiding the movement of the crossbar in the extending direction may not be required. Furthermore, the crossbar body part and the instant bar body part may be formed of an insulating material.

Therefore, even if the crossbar and the instant bar extend across each heater member through which currents of various phases flow, an occurrence of electrical interference between the currents can be minimized.

BRIEF DESCRIPTION OF THE DRAWINGS

FIG. 13 is a perspective view illustrating the instant bar provided in the crossbar assembly of FIGS. 5 to 7 at a different angle.

FIG. 14 is a perspective view illustrating the instant bar provided in the crossbar assembly of FIGS. 5 to 7 at a different angle.

FIG. 15 is a perspective view illustrating the instant bar provided in the crossbar assembly of FIGS. 5 to 7 at a different angle.

DETAILED DESCRIPTION

Figure 1:
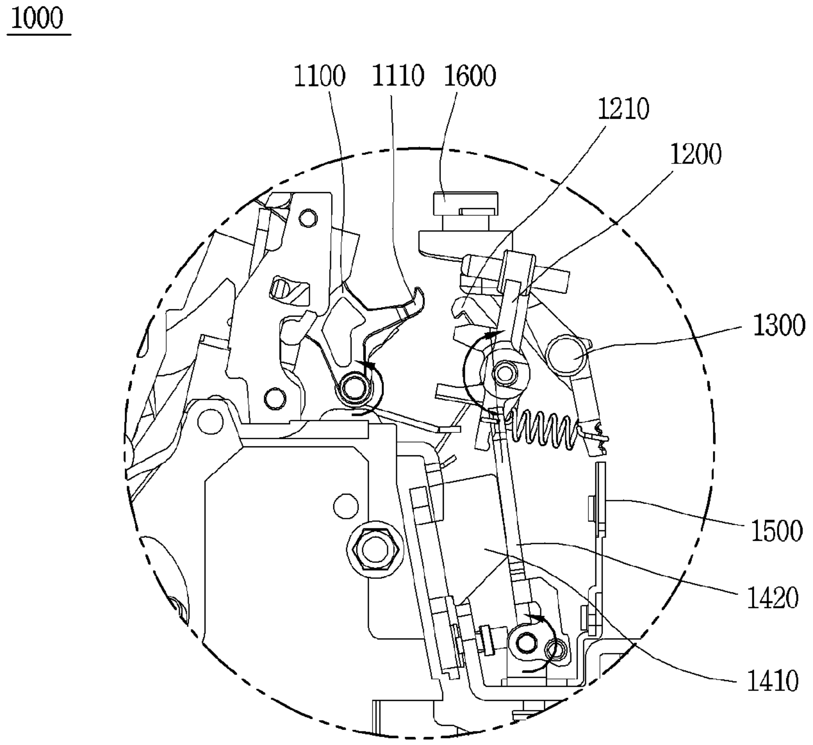
FIG. 1 is a cross-sectional view illustrating an operating state of a crossbar assembly according to the related art.
Figure 2:
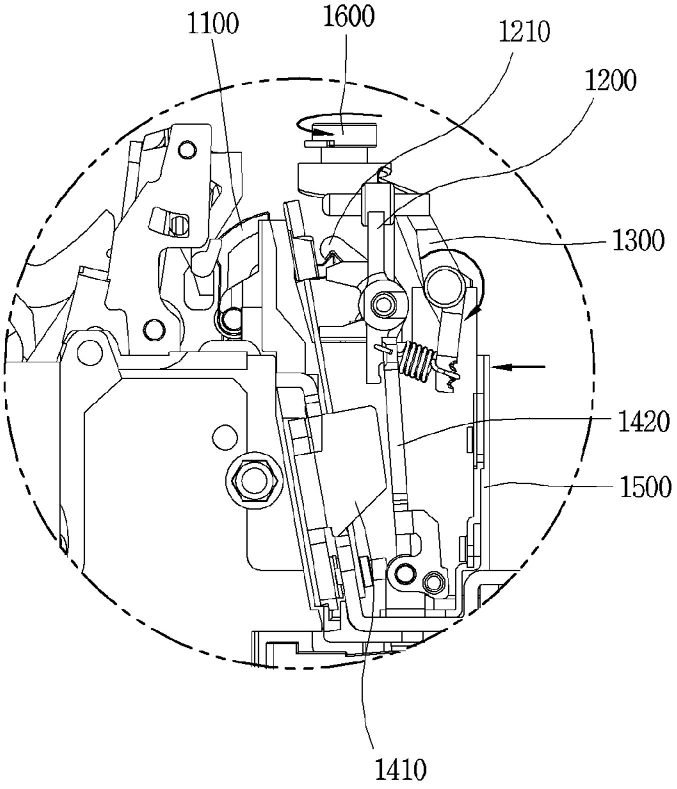
FIG. 2 is a cross-sectional view illustrating the operating state of the crossbar assembly according to the related art.

Hereinafter, a crossbar assembly 400 and a trip device 10 including the same according to implementations of the present disclosure will be described in detail with reference to the accompanying drawings.

In the following description, descriptions of some components will be omitted to help understanding of the present disclosure.

1. Definition of Terms

The term "circuit breaker" used in the following description refers to a device that opens and closes an electric circuit. In one implementation, the circuit breaker may be a molded case circuit breaker (MCCB).

The term "overcurrent" used in the following description means a type of current for operating a circuit breaker. In one implementation, the overcurrent may be classified as a "small current". Also, the overcurrent may be a current that generates heat by which a bimetal 310 of an operation unit 300 is curved toward a crossbar assembly 400.

The term "fault current" used in the following description means a type of current for operating a circuit breaker. In one implementation, the fault current may be classified as a "large current". In addition, the fault current may be a current that magnetizes an electromagnet 210 of a driving unit 200 to generate a magnetic field that attracts an armature 220.

The terms "top", "bottom", "left", "right", "front" and "rear" used in the following description will be understood based on a coordinate system illustrated in FIG. 3.

2. Description of Configuration of Trip Device 10 According to Implementation A trip device 10 according to an implementation may be provided in a circuit breaker to block a circuit when an overcurrent or a fault current flows. In one implementation, the trip device 10 may be disposed in a molded case circuit breaker.

Figure 3:
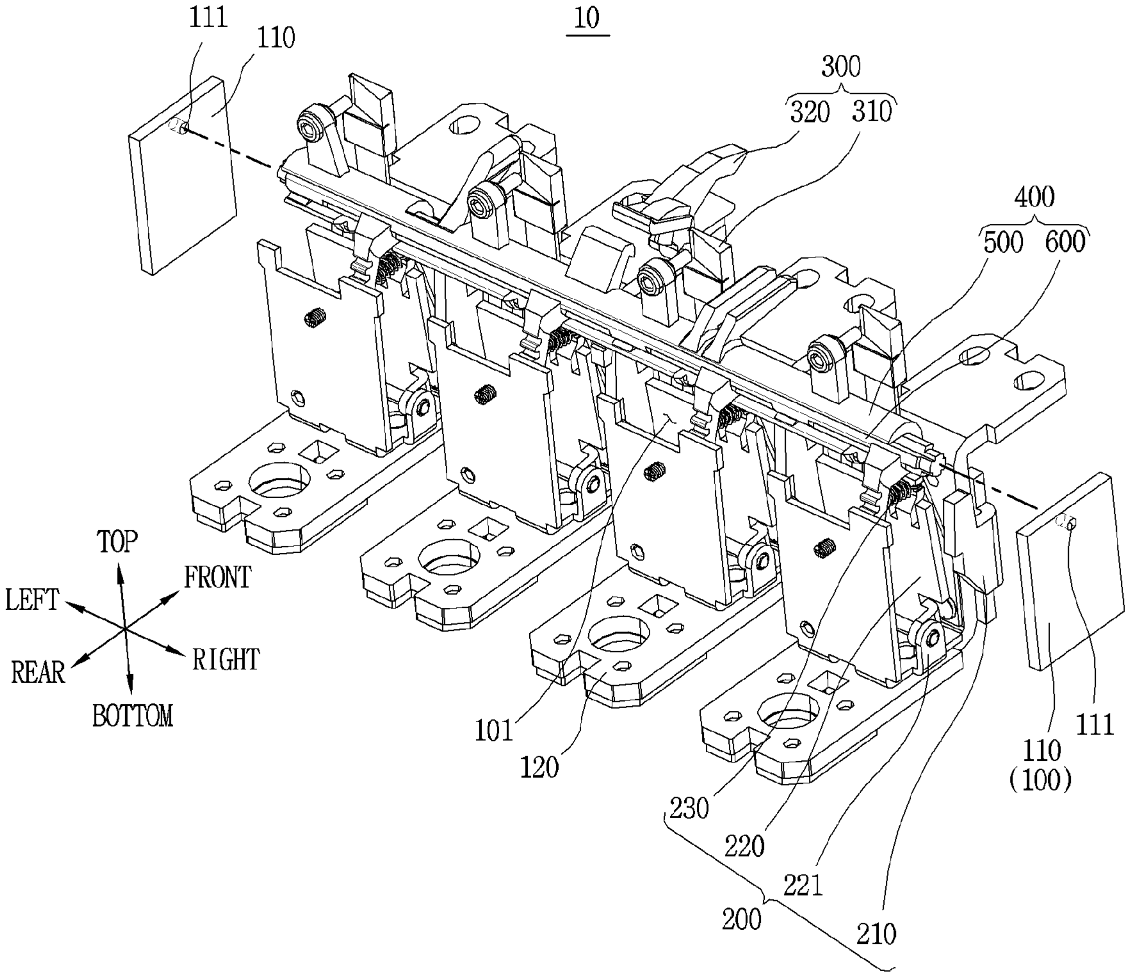
FIG. 3 is a perspective view illustrating a trip device including a crossbar assembly in accordance with one implementation.
Figure 4:
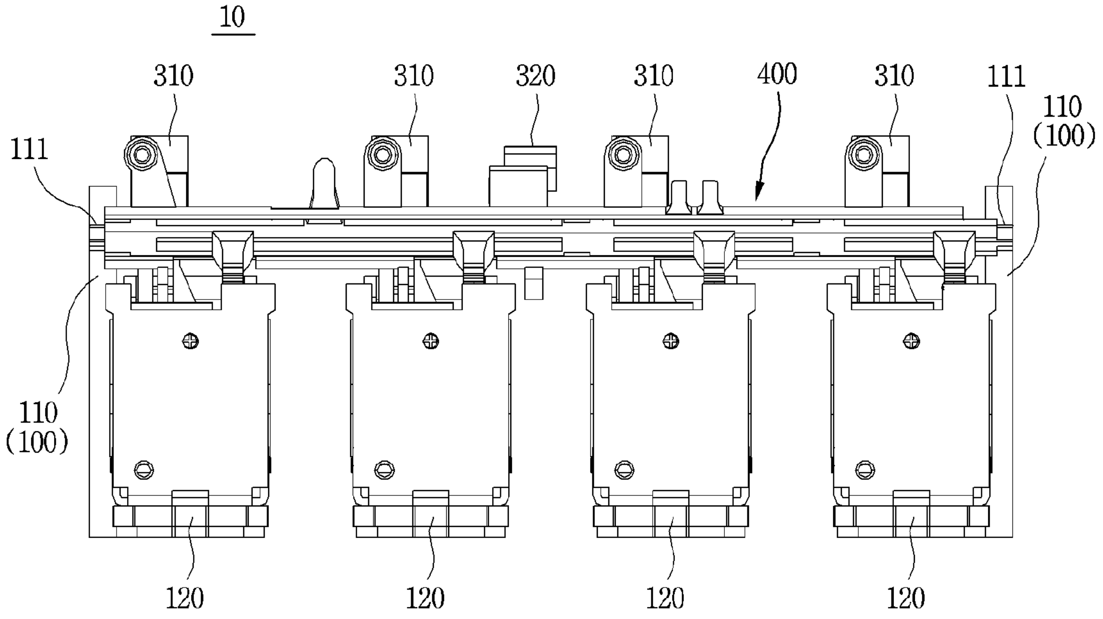
FIG. 4 is a front view of the trip device of FIG. 3.

Referring to FIGS. 3 and 4, the trip device 10 according to the illustrated implementation may include a frame 100, a driving unit 200, an operation unit 300, and a crossbar assembly 400.

Hereinafter, each component of the trip device 10 according to the implementation will be described with reference to FIGS. 3, 4 and 19A and 19B, and the crossbar assembly 400 will be described as a separate clause.

(1) Description of Frame 100

The frame 100 may define appearance of the trip device 10. Various components for performing a trip operation may be accommodated in the frame 100.

The frame 100 may be formed of an insulating material. This may prevent an arbitrary electrical connection between inside and outside of the trip device 10.

The frame 100 may be formed of a material having pressure resistance and thermal resistance. This can prevent damage due to an arc that is generated when a movable contactor and a fixed contactor are separated from each other as the trip device 10 is driven.

In one implementation, the frame 100 may be formed of a synthetic resin.

In the illustrated implementation, the frame 100 may include a space portion 101, side walls 110, and a heater member 120. Although not illustrated, the frame 100 may include a front wall (not illustrated), a rear wall (not illustrated), an upper wall (not illustrated), and a lower wall (not illustrated) that are continuously formed with the side walls 110 and surround the heater member 120.

The space portion 101 may be a space in which each component of the trip device 10 is accommodated. In the illustrated implementation, the driving unit 200 may be accommodated in the space portion 101 and the operation unit 300 may partially be accommodated in the space portion 101.

The space portion 101 may be provided in plurality. The plurality of space portions 101 may be disposed adjacent to each other. In the illustrated implementation, a total of four space portions 101 may be defined to be continuously arranged adjacent to one another in left and right directions.

This may result from that the circuit breaker having the trip device 10 is configured to block currents of three phases, which include R-phase, S-phase, and T-phase or U-phase, V-phase, and W-phase, and N-phase. The number of the space portion 101 may vary.

A partition wall (not illustrated) may be disposed between the space portions 101. The partition wall (not illustrated) may physically partition the adjacent space portions 101. The partition wall 120 can prevent an arbitrary contact or electrical connection between components accommodated in the respective space portions 101.

The side walls 110 may define both sides in a widthwise direction of the frame 100, namely, both right and left outer walls in the illustrated implementation. The side walls 110 may be configured to surround the driving unit 200, the operation unit 300, and the crossbar assembly 400.

Rotation shaft insertion portions 111 may be formed through the side walls 110.

Rotation shafts 612 of an instant bar 600 may be rotatably inserted into the rotation shaft insertion portions 111. The instant bar 600 may be rotated relative to the side walls 110.

In the illustrated implementation, the rotation shaft insertion portion 111 may have a circular cross-section. The rotation shaft insertion portion 111 may change to correspond to the cross-sectional shape of the rotation shaft 612. However, the rotation shaft insertion portion 111 may preferably have a cylindrical shape so that the inserted rotation shaft 612 can rotate smoothly.

The heater member 120 may electrically connect inside and outside of the trip device 10. That is, the heater member 120 may be a portion through which the trip device 10 is electrically connected to the outside.

The heater member 120 may protrude by predetermined distances from both sides of each space portion 101, namely, from a front upper side and a rear lower side in the illustrated implementation. The heater member 120 may extend between the protruded portions. In other words, the heater member 120 may be continuously formed from the outside of the front side to the outside of the rear side of the frame 100.

One end portion of the heater member 120, namely, a front end portion in the illustrated implementation may be electrically connected to a fixed contactor disposed in the circuit breaker. When a trip operation is not performed, a current passing through the fixed contactor may be introduced into the heater member 120.

Another end portion of the heater member 120, namely, a rear end portion in the illustrated implementation may be electrically connected to external power source and load. When a trip operation is not performed, a current flowing into the circuit breaker may flow out to the external power source or load via the heater member 120.

When an overcurrent flows through the heater member 120, the heater member 120 may generate heat. The heat may cause the bimetal 310 to be curved toward a bimetal contact part 520 so as to strike the crossbar 500. Accordingly, the crossbar 500 may be rotated away from the shooter 320, thereby causing a trip operation.

When a fault current flows in the heater member 120, the heater member 120 may generate an electromagnetic field. By the electromagnetic field, the electromagnet 210 located adjacent to the heater member 120 may be magnetized.

Accordingly, the armature 220 may be moved toward the electromagnet 210 and strike the crossbar 500. This may cause the crossbar 500 to be rotated away from the shooter 320, thereby causing a trip operation.

(2) Description of Driving Unit 200

When a fault current flows through the heater member 120, the driving unit 200 may generate driving force for rotating the crossbar 500.

The driving unit 200 may be accommodated in the space portion 101 of the frame 100. The driving unit 200 may be provided in plurality. The plurality of driving units 200 may be accommodated in the plurality of space portions 101, respectively. In the illustrated implementation, four driving units 200 may be provided.

As described above, each space portion 101 may be physically and electrically spaced apart from another space portion 101. Accordingly, each driving unit 200 accommodated in the space portion 101 may also be physically and electrically spaced apart from another driving unit 200.

The driving unit 200 may be located between a front end portion and a rear end portion of the heater member 120. The electromagnetic field generated by the heater member 120 may be utilized to generate a magnetic force for the electromagnet 210 to attract the armature 220.

The driving unit 200 may include an electromagnet 210, an armature 220, and an elastic member 230.

The electromagnet 210 may be magnetized by the electromagnetic field generated by the heater member 120. When the electromagnet 210 is magnetized, the armature 220 spaced apart from the electromagnet 210 may be attracted by a magnetic force generated by the electromagnet 210.

The electromagnet 210 may be disposed adjacent to the heater member 120. In the illustrated implementation, the electromagnet 210 may be disposed adjacent to the front side of heater member 120. The electromagnet 210 may be disposed at any position at which it can be magnetized by the electromagnetic field generated by the heater member 120.

In the illustrated implementation, the electromagnet 210 may include a plurality of wing portions. The plurality of wing portions may respectively be disposed to surround the heater member 120. This can allow the electromagnetic field generated by the heater member 120 to be effectively transmitted to the electromagnet 210. This can also strengthen the magnetic field that the electromagnet 210 applies to the armature 220.

The electromagnet 210 may be disposed to be spaced apart from the armature 220 by a predetermined distance. By the magnetic force generated by the electromagnet 210, the armature 220 may be moved by the predetermined distance to strike the crossbar 500.

The armature 220 may be moved toward the electromagnet 210 by the magnetic force generated by the magnetization of the electromagnet 210. Accordingly, the armature 220 can strike the crossbar 500 and the shooter 320 can be rotated, such that a trip operation can be performed.

The armature 220 may be implemented as any member that can be attracted by magnetic force. In one implementation, the armature 220 may be formed of a conductive material such as iron.

The armature 220 may be disposed to be spaced apart from the heater member 120. The armature 220 may also disposed to be spaced apart from the electromagnet 210.

The armature 220 may be rotatably coupled to the frame 100. In the illustrated implementation, a lower side of the armature 220 may be coupled to the frame 100 by a hinge member 221. That is, the armature 220 may be rotated centering on the hinge member 221.

The armature 220 may be connected to the crossbar 500. When the armature 220 is rotated toward the electromagnet 210, the crossbar 500 may be rotated in a direction to be spaced apart from the shooter 320. Accordingly, the contact state between a shooter hook portion 321 and a contact hook portion 541 can be released and the shooter 320 can be rotated. As a result, the shooter 320 can strike a trip mechanism (not illustrated) to perform a trip operation.

The armature 220 may be connected to the instant bar 600 through the elastic member 230.

The elastic member 230 may connect the armature 220 and the instant bar 600. The elastic member 230 may apply elastic force for rotating the instant bar 600 when the armature 220 is moved toward the electromagnet 210.

The elastic member 230 may be arbitrarily configured to be capable of storing restoring force by deformation and applying the stored restoring force to another member. In one implementation, the elastic member 230 may be configured as a coil spring.

Strength of the electromagnetic field generated by the heater member 120 and the magnetic field generated by the electromagnet 210 may depend on a fault current flowing through the heater member 120.

At this time, the elastic member 230 may apply a force to the armature 220 in a direction opposite to the magnetic force. Accordingly, in order for the armature 220 to be moved toward the electromagnet 210, the strength of the magnetic force formed by the electromagnet 210 must be greater than or equal to the elastic force of the elastic member 230.

Therefore, the strength of the elastic force or the restoring force of the elastic member 230 can be adjusted so as to adjust the magnitude of the fault current for the trip device 10 to perform a trip operation.

For the adjustment, one end portion of the elastic member 230 may be connected to the armature 220 and another end portion of the elastic member 230 may be connected to an elastic member coupling part 620 of the instant bar 600. As will be described later, a plurality of coupling grooves 621, 622, and 623 may be formed in the elastic member coupling part 620. Each coupling groove 621, 622, and 623 may be formed at a different distance from the armature 220.

Accordingly, the elastic force stored by the elastic member 230 can be adjusted according to the coupling groove 621, 622, 623 to which the elastic member 230 is connected. This can adjust the magnitude of the reference current for performing a trip operation.

(3) Description of Operation Unit 300

The operation unit 300 may operate to rotate the crossbar 500 when an overcurrent flows through the heater member 120. Accordingly, the shooter 320 may be rotated to cause a trip operation.

The operation unit 300 may partially be accommodated in the space portion 101 of the frame 100. In addition, the shooter 320 of the operation unit 300 may be rotatably coupled to the frame 100. In the illustrated implementation, it will be understood that the coupled state between the shooter 320 and the frame 100 is not illustrated.

The operation unit 300 may be provided in plurality. In detail, the bimetal 310 of the operation unit 300 may be provided in plurality. The plurality of bimetals 310 may be partially accommodated in the plurality of space portions 101, respectively. In the illustrated implementation, four bimetals 310 may be provided.

The operation unit 300 may include a bimetal 310 and a shooter 320.

The bimetal 310 may be curved by heat generated by the heater member 120 as an overcurrent flows. The bimetal 310 may be curved toward the bimetal contact part 520 of the crossbar 500.

When the bimetal 310 is curved over a predetermined distance, that is, a distance between the bimetal 310 and the bimetal contact part 520, the bimetal 310 may hit the bimetal contact part 520. Responsive to this, the crossbar 500 to which the bimetal contact part 520 is connected can be rotated, the contact state with the shooter 320 can be released, and thus the shooter 320 can be rotated. This may result in causing the trip operation.

The bimetal 310 may be formed of two or more materials having different thermal expansion coefficients. At this time, the bimetal 310 should be curved toward the bimetal contact part 520. Therefore, a thermal expansion coefficient of one side of the bimetal 310 facing the bimetal contact part 520 may preferably be smaller than a thermal expansion coefficient of another side disposed in the direction away from the bimetal contact part 520.

The bimetal 310 may extend from the heater member 120 up to the bimetal contact part 520. In the illustrated implementation, the bimetal 310 may extend from the front lower side of the space portion 101 up to a height adjacent to the bimetal contact part 520 in the vertical direction.

One side surface of the bimetal 310 facing the bimetal contact part 520 may be inclined. In detail, the one side surface of the bimetal 310 may be inclined in the extending direction of the crossbar assembly 400, namely, in the left and right directions in the illustrated implementation.

Accordingly, when the crossbar 500 is moved in its extending direction, the shortest distance between the end portion of the bimetal contact part 520 and the bimetal 310 can be adjusted. This can allow the adjustment of a distance by which the bimetal 310 needs to be moved to perform the trip operation, that is, a trip distance.

The shooter 320 may be rotated by the rotation of the crossbar 500 to hit a trip mechanism provided in the circuit breaker. This can cause the trip operation.

The shooter 320 may be rotatably coupled to the circuit breaker. The coupled state between the shooter 320 and the circuit breaker is not illustrated as described above.

The shooter 320 may be connected to the trip mechanism (not illustrated). The shooter 320 may be rotated to hit the trip mechanism (not illustrated), thereby causing the trip operation.

The armature 320 may be in contact with the crossbar 500. Specifically, the shooter hook portion 321 of the shooter 320 may be in contact with the contact hook portion 541 of the crossbar 500. Accordingly, when no fault current or overcurrent flows, arbitrary rotation of the shooter 320 can be prevented.

A single shooter 320 may be provided. The shooter 320 may be disposed between the bimetal contact portions 520 adjacent to each other. In the illustrated implementation, the shooter 320 may be disposed such that two bimetal contact portions 520 are located at each of left and right sides thereof. The position of the shooter 320 may change depending on the position of the shooter contact part 540 of the crossbar 500.

An elastic member (not illustrated) may be provided on one side of the shooter 320 in the direction away from the crossbar 500, namely, on the front side in the illustrated implementation. The elastic member (not illustrated) may apply elastic force such that the shooter 320 can be rotated away from the crossbar 500, namely, in a clockwise direction in the illustrated implementation.

Accordingly, when the contact state between the shooter hook portion 321 and the contact hook portion 541 is released, the shooter 320 can be instantaneously rotated clockwise and hit the trip mechanism (not illustrated).

The shooter 320 may include a shooter hook portion 321 and a shooter rotation shaft 322.

The shooter hook portion 321 may be a portion where the shooter 320 is in contact with the crossbar 500. In addition, the shooter hook portion 321 can prevent arbitrary rotation of the shooter 320.

The shooter hook portion 321 may be located on one end portion of the shooter 320 facing the crossbar 500. The shooter hook portion 321 may protrude from the one end portion of the shooter 320 in a direction away from the crossbar 500, namely, upward in the illustrated implementation.

It will be understood that the direction in which the shooter hook portion 321 protrudes is opposite to the direction in which the contact hook portion 541 of the shooter contact part 540 protrudes.

The shooter hook portion 321 may be brought into contact with the contact hook portion 541. In addition, the shooter hook portion 321 may be hooked onto the contact hook portion 541.

Specifically, the shooter hook portion 321 may be coupled to the contact hook portion 541 by applying a force to the shooter contact part 540 in a direction from bottom to top. Similarly, the contact hook portion 541 may be coupled to the shooter hook portion 321 by applying a force to the shooter 320 in a direction from top to bottom.

Figure 19A:
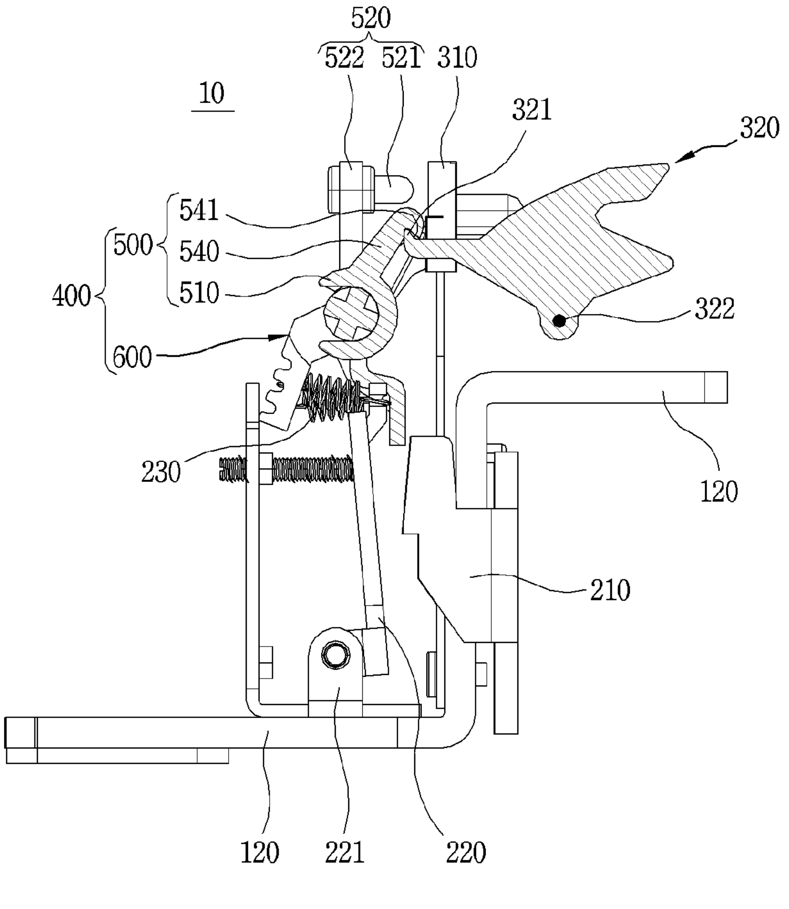
FIGS. 19A and 19B are cross-sectional views illustrating a process of operating the trip device of FIG. 3.
Figure 19B:
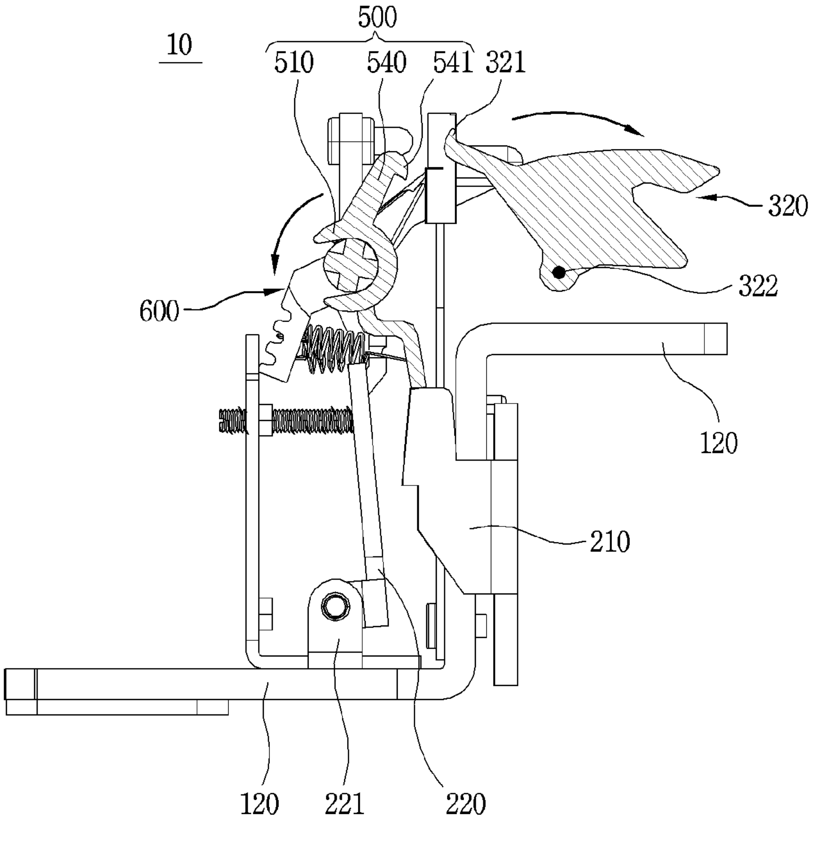

When a fault current or an overcurrent flows in the heater member 120, the crossbar 500 may be rotated in a direction in which the contact hook portion 541 and the shooter hook portion 321 are spaced apart from each other, that is, in the counterclockwise direction in the implementation illustrated in FIGS. 19A and 19B. Accordingly, the contact state between the contact hook portion 541 and the shooter hook portion 321 can be released and the shooter 320 can be free. The shooter 320 can thusly be rotated clockwise in the implementation illustrated in FIGS. 19A and 19B, to hit the trip mechanism (not illustrated).

The shooter rotation shaft 322 may be a portion by which the shooter 320 is rotatably coupled to the trip device 10. The shooter 320 released from the crossbar 500 through the process can be rotated centering on the shooter rotation shaft 322.

3. Description of Configuration of Crossbar Assembly 400 According to Implementation Referring to FIGS. 3 to 5, the trip device 10 according to the implementation may include the crossbar assembly 400.

When an overcurrent or a fault current flows in the heater member 120, the crossbar assembly 400 may be rotated according to the operation of the driving unit 200 or the operation unit 300. The shooter 320 may be released from the crossbar 500, in response to the rotation of the crossbar assembly 400, to strike the trip mechanism (not illustrated). This can result in performing a trip operation.

The crossbar assembly 400 according to the implementation may include the crossbar 500 and the instant bar 600. In particular, the crossbar 500 may be rotated centering on the same central shaft as the instant bar 600.

Accordingly, compared to a case in which the crossbar 500 and the instant bar 600 are rotated centering on different shafts, the space required for rotation can be decreased.

In addition, the crossbar 500 and the instant bar 600 may be coupled to be relatively movable in the longitudinal direction, namely, in the left and right directions in the illustrated implementation. That is, when the crossbar 500 is moved to adjust the distance between the bimetal 310 and the bimetal contact part 520, a bar made of a metal material to serve as a movement shaft may be unnecessary.

Accordingly, conductor members crossing each space portion 101 through which currents of different phases flow may not be needed, thereby minimizing electrical interference between the currents of the different phases.

Hereinafter, the crossbar assembly 400 according to the implementation will be described in detail, with reference to FIGS. 5 to 16.

Figure 5:
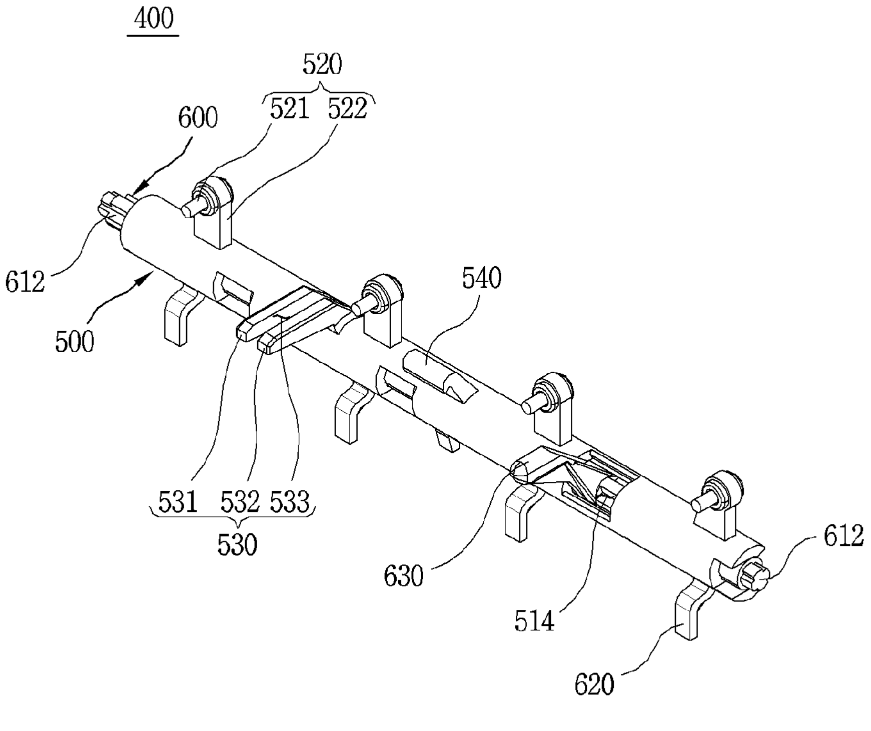
FIG. 5 is a perspective view illustrating a crossbar assembly provided in the trip device of FIG. 3.
Figure 6:
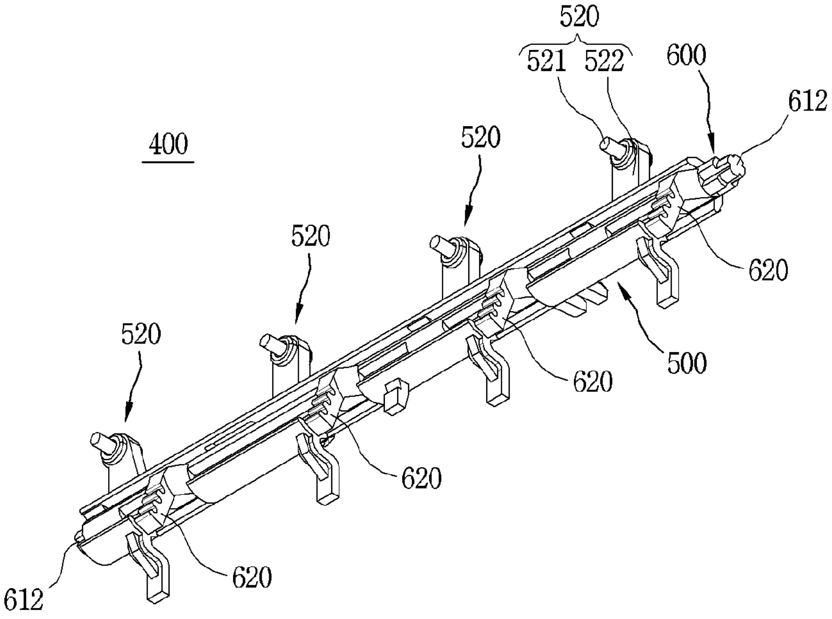
FIG. 6 is a perspective view illustrating the crossbar assembly provided in the trip device of FIG. 3 at a different angle.
Figure 7:
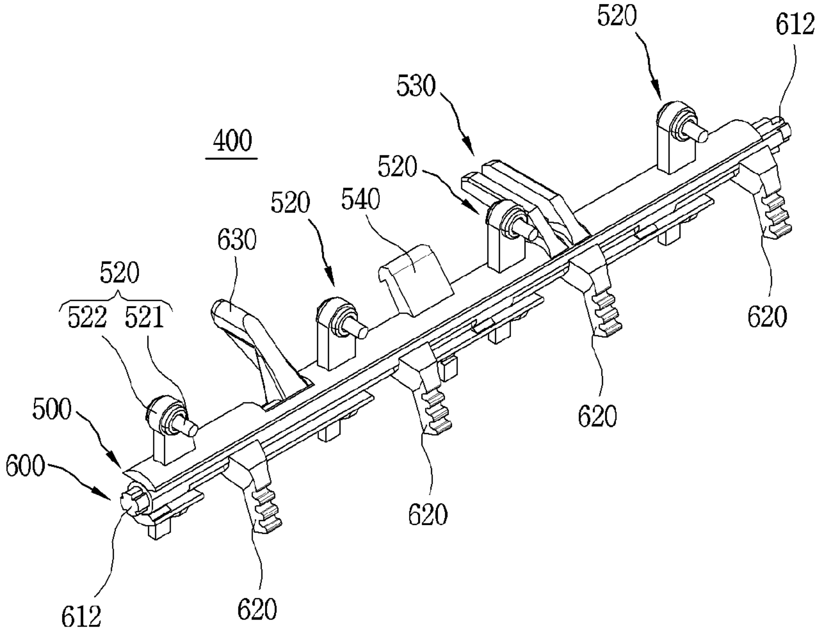
FIG. 7 is a perspective view illustrating the crossbar assembly provided in the trip device of FIG. 3 at a different angle.
Figure 8:
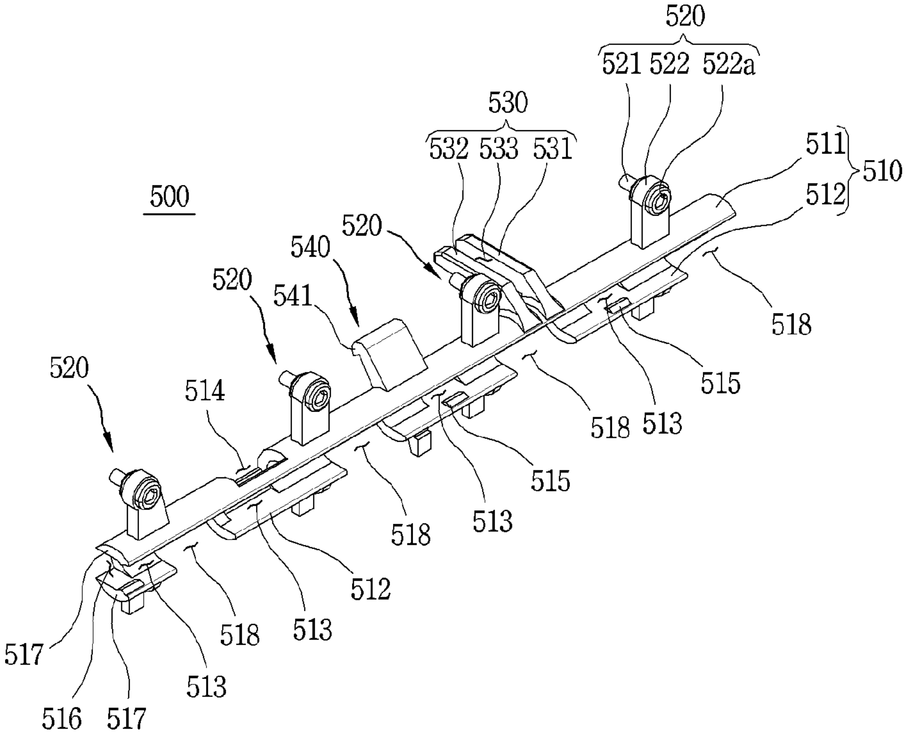
FIGS. 8 to 11 are perspective views illustrating a crossbar provided in the crossbar assembly of FIGS. 5 to 7 at various angles.
Figure 9:
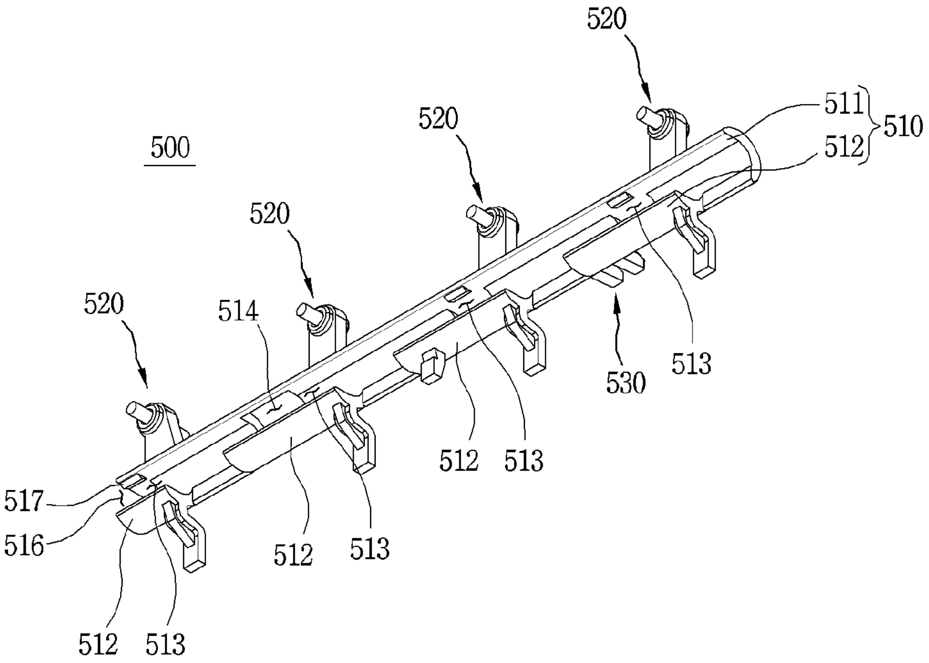
Figure 10:
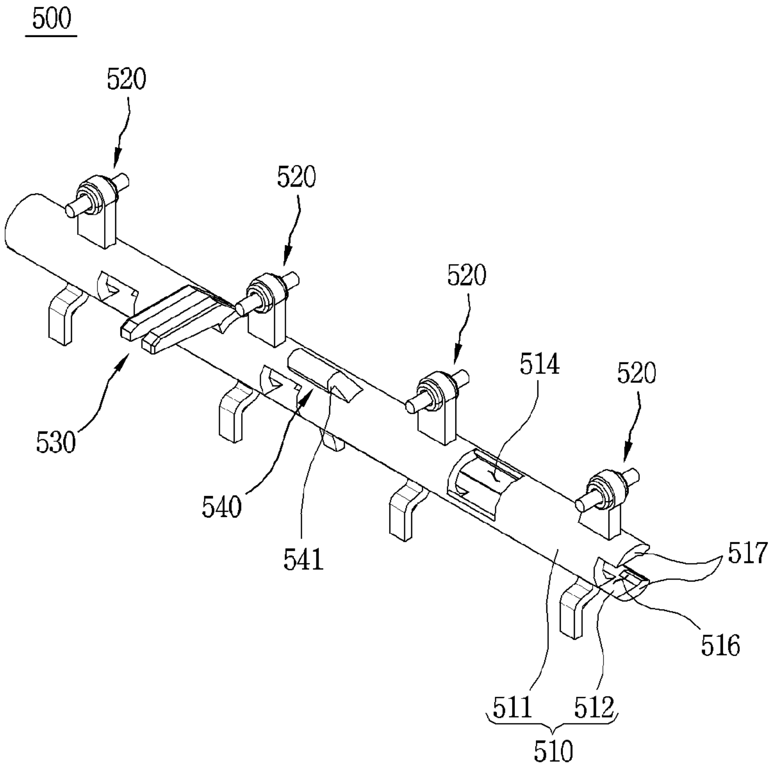
Figure 11:
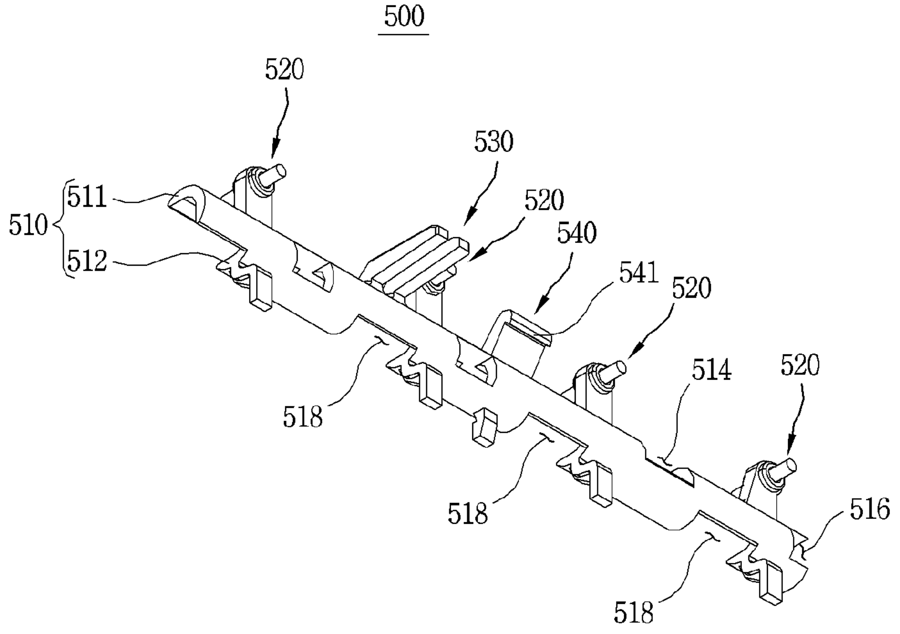
Figure 12:
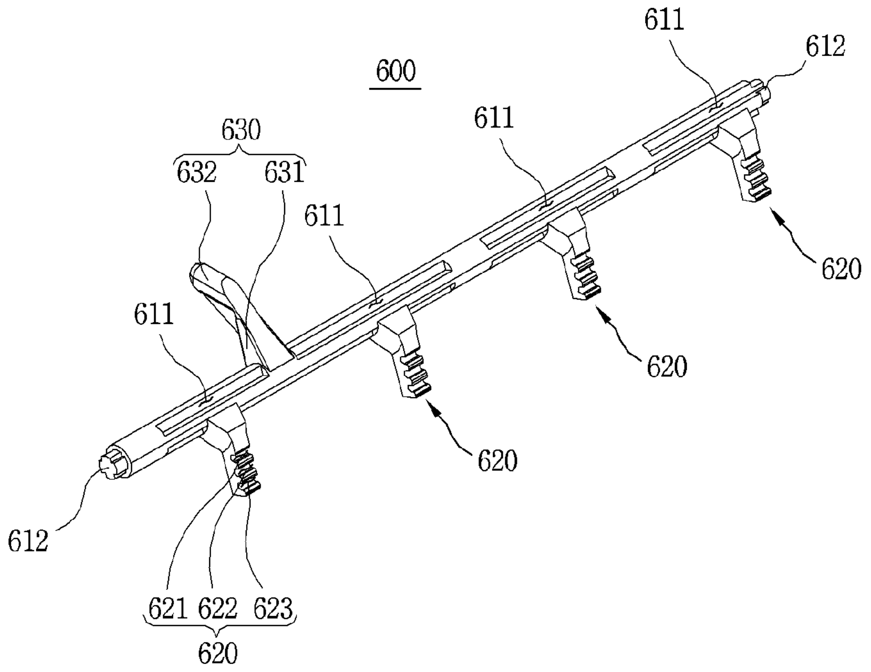
FIGS. 12 to 15 are perspective views illustrating an instant bar provided in the crossbar assembly of FIGS. 5 to 7 at various angles.
Figure 13:
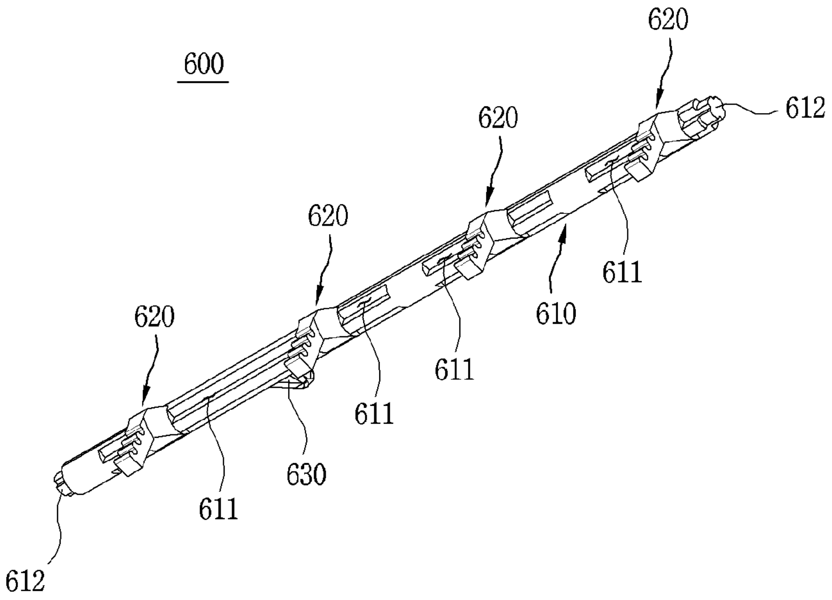
Figure 14:
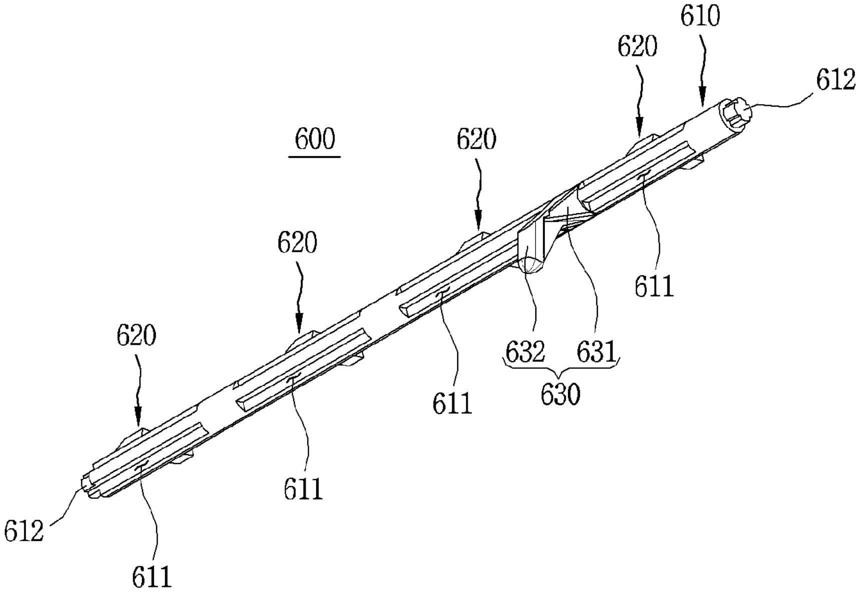
Figure 15:
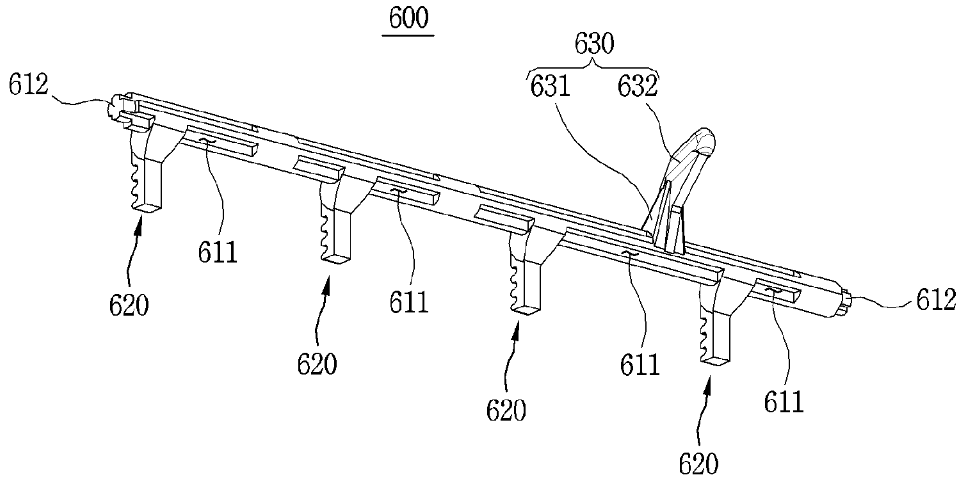

As illustrated in FIG. 5, the crossbar assembly 400 according to the implementation may be configured by the combination of the crossbar 500 and the instant bar 600. Accordingly, it will be understood that the crossbar assembly 400 includes the crossbar 500 and the instant bar 600.

(1) Description of Crossbar 500

Hereinafter, the crossbar 500 according to the implementation will be described in detail, with reference to FIGS. 5 to 11.

The crossbar 500 may configure the crossbar assembly 400 together with the instant bar 600. When a normal current flows in the heater member 120, the crossbar 500 may lock the shooter 320. Accordingly, the rotation of the shooter 320 can be prevented, thereby maintaining the electrical connection between the inside and outside of the circuit breaker.

When an overcurrent or a fault current flows in the heater member 120, the crossbar 500 may be rotated to release the shooter 320. Accordingly, the shooter 320 can be rotated to strike the trip mechanism (not illustrated), and as a result, the trip operation can be performed, so that the electrical connection between the inside and the outside of the circuit breaker can be cut off.

The crossbar 500 may be rotatably coupled to the instant bar 600. The crossbar 500 may be rotated relative to the instant bar 600. Accordingly, regardless of the rotation of the instant bar 600, the crossbar 500 can be rotated to perform a trip operation.

The crossbar 500 may be coupled to the instant bar 600 so as to be movable in its extending direction, namely, in the left and right directions in the illustrated implementation. The crossbar 500 may be moved in the longitudinal direction to be relative to the instant bar 600. Accordingly, regardless of the movement of the instant bar 600, the crossbar 500 can be moved so as to adjust a trip distance, which is the distance between the bimetal 310 and the bimetal contact part 520.

The crossbar 500 may extend in one direction, namely, in the left and right directions in the illustrated implementation. An extended length of the crossbar 500 may preferably be shorter than a distance between the side walls 110 of the frame 100. Accordingly, the crossbar 500 can be moved between the side walls 110 in the coupled state with the instant bar 600.

The crossbar 500 may be formed of an insulating material. This can prevent the occurrence of electrical interference between the components accommodated in each space portion 101 when the crossbar 500 extends between the side walls 110 and passes through each space portion 101.

In the illustrated implementation, the crossbar 500 may include a crossbar body part 510, a bimetal contact part 520, a knob coupling part 530, and a shooter contact part 540.

The crossbar body part 510 may define the body of the crossbar 500. The crossbar body part 510 may extend in one direction, namely, in the left and right directions in the illustrated implementation. An extended length of the crossbar body part 510 may preferably be shorter than the distance between the side walls 110 of the frame 100.

In addition, the extended length of the crossbar body part 510 may preferably be shorter than an extended distance between an instant bar body part 610 of the instant bar 600.

A hollow portion may be formed inside the crossbar body part 510. The hollow portion may be defined as an insertion space portion 513. The instant bar 600 may be rotatably coupled to the insertion space portion 513.

In the illustrated implementation, the crossbar body part 510 may be formed in a cylindrical shape that has a circular cross-section and extends in one direction, namely, in the left and right directions in the illustrated implementation. Accordingly, an outer circumferential surface of the crossbar body part 510 in the longitudinal direction may define a side surface of a cylinder.

The shape of the crossbar body part 510 may change to any shape that can be coupled to be rotatable relative to the instant bar 600.

The crossbar body part 510 may preferably be formed of a material that has a predetermined elasticity to be restored after being deformed. As will be described later, the instant bar 600 may be coupled after a first body portion 511 and a second body portion 512 are deformed in shape, and then the crossbar body part 510 may be restored to its original shape by the elasticity.

The crossbar body part 510 may include a first body portion 511, a second body portion 512, an insertion space portion 513, a movement limiting groove 514, a fixing jaw 515, a rotation shaft coupling portion 516, a rotation shaft support portion 517, and a movement groove 518.

The first body portion 511 may configure a part of the crossbar body part 510. Specifically, the first body portion 511 may define one side of the crossbar body part 510 in a direction away from the instant bar 600, namely, upper and front sides in the illustrated implementation.

As described above, the crossbar body part 510 may be formed in the cylindrical shape. Accordingly, the first body portion 511 may also be rounded to be convex in a direction away from the instant bar 600. In other words, the first body portion 511 may be formed in an arcuate shape whose cross-section is convex toward the outside.

The first body portion 511 may extend in one direction, namely, in the left and right directions in the illustrated implementation. An extended length of the first body portion 511 may preferably be shorter than the distance between the side walls 110 of the frame 100.

The first body portion 511 may partially surround the insertion space portion 513. Specifically, the first body portion 511 may surround the front side and the upper side of the insertion space portion 513 in the illustrated implementation.

The movement limiting groove 514 may be formed through the first body portion 511. In addition, a bimetal contact part 520, a knob coupling part 530, and a shooter contact part 540 may protrude from the first body portion 511.

A lower end portion of the first body portion 511 may be continuously formed with the second body portion 512.

The second body portion 512 may configure a part of the crossbar body part 510. Specifically, the second body portion 512 may configure another side of the crossbar body part 510 facing the instant bar 600, namely, the lower side in the illustrated implementation.

The second body portion 512 may be continuously formed with the first body portion 511. Specifically, a front end portion of the second body portion 512 may be continuously formed with the lower end portion of the first body portion 511.

As described above, the crossbar body part 510 may be formed in the cylindrical shape. Accordingly, the second body portion 512 may also be rounded to be convex in a direction away from the instant bar 600. In other words, the second body portion 512 may be formed in an arcuate shape whose cross-section is convex toward the outside.

The second body portion 512 may extend in one direction, namely, in the left and right directions in the illustrated implementation. The second body portion 512 may preferably be shorter than the extended length of the first body portion 511.

The second body portion 512 may partially surround the insertion space portion 513. Specifically, the second body portion 512 may partially surround the lower side of the insertion space portion 513.

The second body portion 512 may be provided in plurality. The plurality of second body portions 512 may be spaced apart from one another by predetermined distances in the direction in which the second body portion 512 extends, namely, in the left and right directions in the illustrated implementation. In the illustrated implementation, four second body portions 512 may be provided.

The movement groove 518 may be formed between the second body portions 512 adjacent to each other. The second body portion 512 may be disposed such that the position of each movement groove 518 corresponds to the position of the elastic member coupling part 620 of the instant bar 600.

The fixing jaw 515 may protrude from an inner surface of the second body portion 512, that is, one side surface of the second body portion 512 facing the insertion space portion 513. The fixing jaw 515 can prevent the instant bar body part 610 inserted into the insertion space portion 513 from being arbitrarily separated from the insertion space portion 513.

The insertion space portion 513 may be a space into which the instant bar body part 610 is inserted. The insertion space portion 513 may be defined as a space surrounded by the first body portion 511 and the second body portion 512.

More specifically, one side of the insertion space portion 513 facing the shooter 320, that is, the front side and the upper side in the illustrated implementation may be surrounded by the first body portion 511. In addition, another side of the insertion space portion 513 facing the space portion 101, that is, the lower side in the illustrated implementation may be surrounded by the second body portion 512.

One side of the insertion space portion 513 facing the instant bar 600, that is, the rear side in the illustrated implementation may be open. Accordingly, the instant bar 600 can be inserted into the insertion space portion 513 through the open rear side of the insertion space portion 513.

The insertion space portion 513 may extend in one direction, namely, in the left and right directions in the illustrated implementation. This may result from that the first body portion 511 and the second body portion 512 surrounding the insertion space portion 513 extend in the above direction.

In the illustrated implementation, the insertion space portion 513 may be defined as a cylindrical hollow portion having a circular cross-section. This may result from that each cross-section of the first body portion 511 and the second body portion 512 is formed in an arcuate shape.

The shape of the insertion space portion 513 may vary. However, in order for the crossbar 500 and the instant bar 600 to be smoothly rotated relative to each other, the insertion space portion 513 may preferably be a cylindrical hollow portion.

The insertion space portion 513 may communicate with the movement limiting groove 514 located on the front side. A movement limiting protrusion 630 that extends from the instant bar body part 610 inserted into the insertion space portion 513 may be inserted through the movement limiting groove 514.

The insertion space portion 513 may communicate with rotation shaft coupling portions 516 that are formed in both end portions in the extending direction, namely, left and right end portions in the illustrated implementation, respectively. The rotation shafts 612 that protrude from both end portions of the instant bar body part 610 inserted into the insertion space portion 513 may be inserted through the rotation shaft coupling portions 516, respectively.

The insertion space portion 513 may communicate with the movement limiting groove 518 located on the lower side. The elastic member coupling part 620 that extends from the instant bar body part 610 inserted into the insertion space portion 513 may be inserted through the movement groove 518.

When the instant bar 600 is inserted into the insertion space portion 513, the crossbar 500 and the instant bar 600 can be rotated relative to each other. In addition, the inserted instant bar 600 and the crossbar 500 may be moved relative to each other in the extending one direction, namely, in the left and right directions in the illustrated implementation.

The movement limiting groove 514 may be configured to limit the relative rotation and movement of the crossbar 500 and the instant bar 600. The movement limiting protrusion 630 of the instant bar 600 may be inserted through the movement limiting groove 514.

The movement limiting groove 514 may be formed through the first body portion 511. In the illustrated implementation, the movement limiting groove 514 may be located to be biased in one direction in which it extends, namely, biased to the left side. In addition, the movement limiting groove 514 may be located between a bimetal contact part 520 located at the leftmost side and another bimetal contact part 520 adjacent thereto.

The position of the movement limiting groove 514 may vary depending on the position of the movement limiting protrusion 630 of the instant bar 600 coupled to the crossbar 500.

In the illustrated implementation, the movement limiting groove 514 may extend by a predetermined length in each of the longitudinal direction and a circumferential direction of the first body portion 511. That is, the movement limiting groove 514 may have a rectangular cross-section with a long side in the extending direction of the first body portion 511 and a short side in the circumferential direction.

The movement limiting groove 514 may be formed in any shape into which the movement limiting protrusion 630 can be inserted and in which the movement limiting protrusion 630 can be brought into contact with a surface surrounding the movement limiting groove 514 when the crossbar 500 or the instant bar 600 is rotated or moved.

Two surfaces surrounding the movement limiting groove 514, that is, two surfaces that extend in the circumferential direction of the first body portion 511 and face each other may be defined as "movement limiting surfaces".

The movement limiting surfaces may limit a relative movement distance of the crossbar 500 and the instant bar 600 in the extending direction thereof.

That is, as will be described later, the crossbar 500 may be moved to the left or right relative to the instant bar 600.

At this time, when the crossbar 500 is moved by a predetermined distance in one direction, the movement limiting protrusion 630 may be brought into contact with one of the movement limiting surfaces that is located in an opposite direction.

For example, when the crossbar 500 is moved to the right by a predetermined distance, the movement limiting protrusion 630 may be brought into contact with a movement limiting surface located at the left side. Similarly, when the crossbar 500 is moved to the left by a predetermined distance, the movement limiting protrusion 630 may be brought into contact with a movement limiting surface located at the right side.

Accordingly, the distance by which the crossbar 500 is moved relative to the instant bar 600 in the extending direction can be limited. The distance may preferably be determined depending on a length of an inclined surface of the bimetal 310.

The fixing jaw 515 may prevent the instant bar body part 610 inserted into the insertion space portion 513 from being arbitrarily separated from the insertion space portion 513. In one implementation, the fixing jaw 515 may press the inserted instant bar body part 610.

The fixing jaw 515 may protrude by a predetermined length from an inner surface of the second body portion 512, that is, one side surface of the second body portion 512 facing the insertion space portion 513. Accordingly, the instant bar body part 610 can be fitted into the insertion space portion 513.

The fixing jaw 515 may be provided in plurality. In the illustrated implementation, the fixing jaws 515 may be disposed on the two second body portions 512 that are located to be biased to the right. Alternatively, the fixing jaw 515 may be disposed for each second body portion 512.

The rotation shaft coupling portions 516 may be spaces into which the rotation shafts 612 of the instant bar 600 are rotatably coupled.

The rotation shaft coupling portions 516 may be located in the extending direction of the first body portion 511, namely, on the left and right end portions in the illustrated implementation. The rotation shaft coupling portions 516 may be surrounded by the rotation shaft support portions 517.

The rotating shaft coupling portions 516 may communicate with the outside. The rotation shafts 612 inserted into the rotation shaft coupling portions 516 can be rotatably inserted into the rotation shaft insertion portions 111 of the side walls 110.

The rotation shaft coupling portions 516 may communicate with the insertion space portion 513. The rotating shafts 612 may protrude from the respective end portions in the extending direction of the instant bar body part 610 inserted into the insertion space portion 513 to be inserted into the rotating shaft coupling portions 516.

The rotation shaft support portions 517 may partially surround the rotation shaft coupling portions 516. Specifically, the rotation shaft support portions 517 may surround upper and lower sides of the rotation shaft coupling portions 516.

The rotation shaft support portions 517 may rotatably support the rotation shafts 612. The rotation shaft support portions 517 may include first support portions located on both end portions in the extending direction of the first body portion 511, and a second support portion located on one end portion in the extending direction of the second body portion 512, namely, on the left end portion in the illustrated implementation.

The first support portions and the second support portion may support upper and lower sides of the rotation shafts 612, respectively.

The movement groove 518 may be a space into which the elastic member coupling part 620 of the instant bar 600 is inserted. The movement groove 518 may be formed as the plurality of second body portions 512 are spaced apart from each other. That is, the movement groove 518 may be a space defined between the second body portions 512 adjacent to each other.

The movement groove 518 may be provided in plurality. In the illustrated implementation, the movement grooves 518 may be provided totally by four, namely, three defined between the adjacent second body portions 512, and one defined between the rightmost second body portion 512 and the side wall 110. The number of the movement groove 518 may change depending on the number of the elastic member coupling part 620.

The elastic member 230 connecting the instant bar 600 and the armature 220 may be coupled to the elastic member coupling part 620 through the movement groove 518.

In addition, the movement groove 518 may provide a space in which the crossbar 500 can be moved relative to the instant bar 600 in the extending direction. To this end, the movement groove 518 may extend in one direction, namely, in the left and right directions in the illustrated implementation.

That is, as will be described later, the crossbar 500 may be moved to the left or right relative to the instant bar 600.

At this time, when the crossbar 500 is moved by a predetermined distance in one direction, an end of the second body portion 512, which is located in an opposite direction, of both ends of the second body portion 512 surrounding the movement groove 518 may be brought into contact with the elastic member coupling part 620.

For example, when the crossbar 500 is moved to the right by a predetermined distance, the elastic member coupling part 620 may be brought into contact with the right end of the second body portion 512 located at the left side. Similarly, when the crossbar 500 is moved to the left by a predetermined distance, the elastic member coupling part 620 may be brought into contact with the left end of the second body portion 512 located at the right side.

Accordingly, the distance by which the crossbar 500 is moved relative to the instant bar 600 in the extending direction can be limited. The distance may preferably be determined depending on a length of an inclined surface of the bimetal 310.

To this end, an extended length of each of the plurality of movement grooves 518 in the longitudinal direction, that is, in the left and right directions may preferably be the same.

The bimetal contact part 520 may be a portion with which the bimetal 310 comes in contact when it is curved by heat of the heater member 120 through which an overcurrent flows.

As described above, the bimetal 310 may be formed of two or more materials having different thermal expansion coefficients. At this time, a thermal expansion coefficient of a material located on one side of the bimetal 310 facing the bimetal contact part 520 may be smaller than a thermal expansion coefficient of a material located on another side of the bimetal 310 in a direction away from the bimetal contact part 520.

Accordingly, when heat is transferred to the bimetal 310, the bimetal 310 may be curved toward the bimetal contact part 520 to hit the bimetal contact part 520. The crossbar 500 can thusly be rotated to make the shooter 320 free, thereby causing a trip operation.

The bimetal contact part 520 may be coupled to the first body portion 511. Specifically, the bimetal contact part 520 may protrude from an upper surface of the first body portion 511.

The bimetal contact part 520 may be provided in plurality. The plurality of bimetal contact portions 520 may be spaced apart from one another by predetermined distances. In the illustrated implementation, four bimetal contact portions 520 may be disposed along the extending direction of the first body portion 511. The number of the bimetal contact part 520 may change depending on the number of the bimetal 310.

The bimetal contact portions 520 may be spaced apart from one another by predetermined distances. A distance between the adjacent bimetal contact portions 520 may preferably be determined depending on a distance between the adjacent bimetals 310.

The bimetal contact part 520 may include a contact member 521 and a support member 522.

The contact member 521 may be a portion with which the curved bimetal 310 comes in contact. The contact member 521 may protrude by a predetermined length toward the bimetal 310, namely, toward the front side in the illustrated implementation. The contact member 521 may protrude by a predetermined length in one direction toward the bimetal 310, namely, in front and rear directions in the illustrated implementation.

The contact member 521 may be provided in plurality. The plurality of contact members 521 may be spaced apart from one another by predetermined distances.

As described above, the crossbar 500 may be moved along the extending direction. In this case, the movement distance of the crossbar 500 may preferably be determined so that the contact member 521 is located on an inclined surface of the bimetal 310.

That is, when the crossbar 500 is maximally moved toward one side in the extending direction, the contact member 521 may also be located on the one side of the inclined surface of the bimetal 310. On the contrary, when the crossbar 500 is maximally moved toward another side in the extending direction, the contact member 521 may also be located on the another side of the inclined surface of the bimetal 310.

Furthermore, one side of the bimetal 310 facing the contact member 521, namely, the rear side surface in the illustrated implementation, may be inclined in the direction in which the first body portion 511 extends.

Accordingly, when the crossbar 500 is moved in the extending direction, the shortest distance between the contact member 521 and the bimetal 310 can be adjusted. This can adjust a trip section for performing a trip operation.

It will be understood that the shortest distance is a distance between one end of the contact member 521 facing the bimetal 310 and one side of the bimetal 310 facing the contact member 521.

The contact member 521 may be coupled through the support member 522. Alternatively, the contact member 521 and the support member 522 may be integrally formed with each other.

The support member 522 may extend from the first body portion 511 to support the contact member 521. In addition, the contact member 521 may be coupled through the support member 522.

The support member 522 may be provided in plurality. The plurality of support members 522 may be spaced apart from one another by predetermined distances. In the illustrated implementation, four support members 522 may be provided.

A criterion for the predetermined distance by which the support members 522 are spaced apart from each other may be the same as a criterion for the distance by which the contact members 521 are spaced apart from each other.

The contact member 521 may be coupled through the support member 522. The support member 522 may adjust a length by which the contact member 521 is exposed in a direction toward the bimetal 310. Accordingly, the distance between the bimetal 310 and the contact member 521 can be adjusted, resulting in adjusting the trip section.

A lower side of the support member 522 may extend from the first body portion 511. In one implementation, the support member 522 and the first body portion 511 may be integrally formed with each other.

The support member 522 may include a contact member insertion hole **522*a*. A contact member 521 may be inserted through the contact member insertion hole 522*a*. The contact member insertion hole 522*a* may include a separate fastening member (not illustrated). The fastening member (not illustrated) may prevent an arbitrary separation of the inserted contact member 521 or limit an arbitrary change in the distance from the bimetal 310**.

The knob coupling part 530 may be a portion to which a knob or dial (not illustrated) is rotatably coupled. A rotary motion of the knob (not illustrated) may be converted into a linear motion of the crossbar 500 by the knob coupling part 530.

The knob coupling part 530 may be located on the first body portion 511. The knob coupling part 530 may extend from an upper side of the first body portion 511 in a direction away from the instant bar 600.

In the illustrated implementation, the knob coupling part 530 may be located between two bimetal contact portions 520 located at the right side. The knob coupling part 530 may be disposed at any position to which the knob (not illustrated) can be rotatably coupled.

The knob coupling part 530 may include a first extension portion 531, a second extension portion 532, and a knob insertion space portion 533.

The first extension portion 531 and the second extension portion 532 may extend in a direction away from the instant bar 600. The first extension portion 531 and the second extension portion 532 may support the knob (not illustrated) inserted into the knob insertion space portion 533.

The first extension portion 531 and the second extension portion 532 may be spaced apart from each other by a predetermined distance. A space defined as the first extension portion 531 and the second extension portion 532 are spaced apart from each other may be the knob insertion space portion 533. The knob (not illustrated) may be rotatably inserted into the knob insertion space portion 533.

The shooter contact part 540 may be a portion where the crossbar 500 is in contact with the shooter 320. In a state in which a normal current flows through the heater member 120, the shooter contact part 540 may lock the shooter 320 to prevent arbitrary rotation of the shooter 320.

The shooter contact part 540 may be disposed on the first body portion 511. Specifically, the shooter contact part 540 may be located on an upper portion, which covers the insertion space portion 513 from the upper side, of the first body portion 511.

In the illustrated implementation, the shooter contact part 540 may be located at a middle portion in the extending direction of the first body portion 511. That is, the shooter contact part 540 may be located between the two bimetal contact parts 520, which are located at the middle portion in the extending direction of the first body portion 511, among the plurality of bimetal contact parts 520.

The position of the shooter contact part 540 may change depending on the position of the shooter 320.

The shooter contact part 540 may extend from the first body portion 511 toward the shooter 320 by a predetermined length. That is, the shooter contact part 540 may extend from the first body portion 511 to be away from the instant bar 600.

The shooter contact part 540 may extend at a predetermined angle with a plane, which comes in contact with an outer circumferential surface of the first body portion 511 passing through the contact portion between the shooter contact part 540 and the first body portion 511. That is, the shooter contact part 540 may extend obliquely with respect to the plane.

In other words, the shooter contact part 540 may extend at a predetermined angle with the front end or rear end of the heater member 120. The shooter contact part 540 may extend so that an end portion thereof facing the shooter 320 comes in contact with the shooter 320.

A contact hook portion 541 may be disposed on the end portion of the shooter contact part 540.

The contact hook portion 541 may come in contact with the shooter hook portion 321. The contact hook portion 541 may be coupled to the shooter hook portion 321 to suppress the shooter 320 from being arbitrarily rotated unless the crossbar 500 is rotated.

The contact hook portion 541 may extend from the end portion of the shooter contact part 540 toward the shooter 320 by a predetermined length. A predetermined space may be defined between the contact hook portion 541 and the shooter contact part 540. The shooter hook portion 321 may be inserted into the space.

Similarly, a predetermined space may be defined between the shooter hook portion 321 and the shooter 320. The contact hook portion 541 may be inserted into the space.

Accordingly, it can be said that the contact hook portion 541 and the shooter hook portion 321 are coupled to each other in a staggered manner.

Referring back to FIG. 19A, a state in which the shooter hook portion 321 is inserted between the shooter contact part 540 and the contact hook portion 541 is illustrated. Also, the contact hook portion 541 may be located between the shooter hook portion 321 and the shooter 320.

As described above, the shooter 320 may be connected to an elastic member (not illustrated) that applies a pulling force from bottom to top, that is, in the clockwise direction in the illustrated implementation. At this time, the contact hook portion 541 may press the shooter 320 from top to bottom, thereby limiting the rotation of the shooter 320.

As described above, the contact hook portion 541 and the shooter hook portion 321 may be hooked onto each other. Accordingly, unless the crossbar 500 is rotated counterclockwise, the shooter 320 cannot be rotated arbitrarily.

(2) Description of Instant Bar 600

Hereinafter, the instant bar 600 according to the implementation will be described in detail, with reference to FIGS. 5 to 8 and 11 to 15.

The instant bar 600 may configure the crossbar assembly 400 together with the crossbar 500. As described above, when a normal current flows through the heater member 120, the shooter 320 may not be rotated since the crossbar 500 locks the shooter 320.

When an overcurrent or a fault current flows in the heater member 120, the crossbar 500 may be rotated to release the shooter 320. Accordingly, the shooter 320 can be rotated to strike the trip mechanism (not illustrated), and as a result, the trip operation can be performed, so that the electrical connection between the inside and the outside of the circuit breaker can be cut off.

In this case, a reference current for rotating the crossbar 500 to release the shooter 320 may be a problem. That is, it may be necessary to set a magnitude of a current for determining whether an overcurrent or a fault current flows.

In the case of an overcurrent, a magnitude of a current as a reference may be adjusted by adjusting the distance between the bimetal 310 and the bimetal contact part 520 of the crossbar 500.

In the case of a fault current, the magnitude of the reference current may be adjusted by adjusting the elastic force of the elastic member 230 connecting the armature 220 and the instant bar 600. That is, the instant bar 600 may be rotated to adjust the distance from the armature 220, thereby adjusting strength of the elastic force stored in the elastic member 230.

When a fault current flows, a magnetic force that exceeds the elastic force stored in the elastic member 230 should be generated in order for the armature 220 to be rotated toward the electromagnet 210.

Accordingly, the instant bar 600 can be rotated to adjust the magnitude of the overcurrent for performing a trip operation.

The instant bar 600 may be rotatably coupled to the crossbar 500. The instant bar 600 may be rotated relative to the crossbar 500. Accordingly, even if the crossbar 500 is not rotated, the instant bar 600 can be rotated to adjust the magnitude of the overcurrent for performing the trip operation.

When the instant bar 600 and the crossbar 500 are coupled to each other, the crossbar 500 may be moved relative to the instant bar 600 in the extending direction. Accordingly, even though the instant bar 600 is not moved, the crossbar 500 can be moved so as to adjust a trip distance, which is the distance between the bimetal 310 and the bimetal contact part 520.

The instant bar 600 may extend in one direction, namely, in the left and right directions in the illustrated implementation. That is, the instant bar 600 may extend in the same direction as the crossbar 500.

An extended length of the instant bar 600 may be longer than the extended length of the crossbar 500. In addition, the extended length of the instant bar 600 may be the same as the distance between the side walls 110 of the frame 100. Accordingly, the rotation shafts 612 can be stably and rotatably inserted into the rotation shaft insertion portions 111 of the side walls 110.

The instant bar 600 may be formed of an insulating material. This can prevent the occurrence of electrical interference between the components accommodated in each space portion 101 when the instant bar 600 extends between the side walls 110 and passes through each space portion 101.

In the illustrated implementation, the instant bar 600 may include an instant bar body part 610, an elastic member coupling part 620, and a movement limiting protrusion 630.

The instant bar body part 610 may define the body of the instant bar 600. The instant bar body part 610 may extend in one direction, namely, in the left and right directions in the illustrated implementation. An extended length of the instant bar body part 610 may preferably be shorter than the distance between the side walls 110 of the frame 100.

This may result from the fact that the rotation shaft 612 protrudes from each end portion of the instant bar body part 610 in the extending direction.

In the illustrated implementation, the instant bar body part 610 may be formed in a cylindrical shape that has a circular cross-section and extends in one direction, namely, in the left and right directions in the illustrated implementation. Accordingly, an outer circumferential surface of the instant bar body part 610 in the longitudinal direction may define a side surface of a cylinder.

The shape of the instant bar body part 610 may preferably be determined depending on the shape of the insertion space portion 513.

A plurality of weight-reducing grooves 611 may be formed inside the instant bar body part 610. Also, the rotation shaft 612 may protrude from each end portion of the instant bar body part 610 in the extending direction.

The weight-reducing grooves 611 may reduce the mass of the instant bar body part 610. In addition, partition walls formed between the weight-reducing grooves 611 can reinforce rigidity of the instant bar body part 610 in the extending direction.

The weight-reducing grooves 611 may extend in one direction, namely, in the left and right directions in the illustrated implementation. That is, the weight-reducing grooves 611 may extend in the same direction as the instant bar body part 610.

The weight-reducing grooves 611 may be provided in plurality. The plurality of weight-reducing grooves 611 may be spaced apart from one another by predetermined distances in the direction in which the instant bar body part 610 extends. In addition, the plurality of weight-reducing grooves 611 may be provided in the circumferential direction of the instant bar body part 610 to be spaced apart from one another by predetermined distances. The shape, number, and position of the weight-reducing groove 611 may change.

The rotation shafts 612 may allow the instant bar body part 610 to be rotatably coupled to the frame 100. The rotation shafts 612 may protrude by predetermined lengths from the respective end portions of the instant bar body part 610 in the extending direction.

The rotation shafts 612 may be rotatably inserted into the rotation shaft insertion portions 111 of the side walls 110. In one implementation, the rotation shafts 612 and the rotation shaft insertion portions 111 may be disposed to have the same central axis.

The maximum distance from the center to an outer circumference of the rotation shaft 612 may be smaller than a diameter of the instant bar body part 610.

When the instant bar 600 is coupled to the crossbar 500, the rotation shaft 612 may be accommodated in the rotation shaft coupling portion 516 of the crossbar 500. An upper or lower side of the rotation shaft 612 may be covered by the rotation shaft support portion 517. Accordingly, the rotation shaft 612 can be supported by the rotation shaft support portion 517.

The elastic member coupling part 620 may be a portion to which the elastic member 230 connecting the armature 220 and the instant bar 600 is coupled. The elastic member coupling part 620 may extend away from the crossbar 500. In other words, the elastic member coupling part 620 may extend away from the shooter 320. In the illustrated implementation, the elastic member coupling part 620 may extend toward a lower side of the rear.

The elastic member coupling part 620 may be provided in plurality. The plurality of elastic member coupling parts 620 may be spaced apart from one another by predetermined distances. In the illustrated implementation, four elastic member coupling parts 620 may be provided. The position and number of the elastic member coupling part 620 may change depending on the number of the space portion 101 and the movement groove 518.

When the instant bar 600 is coupled to the crossbar 500, the elastic member coupling part 620 may be accommodated in the movement groove 518 that communicates with the insertion space portion 513. When the crossbar 500 is moved relative to the instant bar 600 in its extending direction, the elastic member coupling part 620 may be brought into contact with any one of the second body portions 512 defining the movement groove 518.

Accordingly, a distance by which the crossbar 500 is moved in the extending direction can be limited.

The elastic member coupling part 620 may include a first coupling groove 621, a second coupling groove 622, and a third coupling groove 623.

One end portion of the elastic member 230 may be coupled to any one of the first coupling groove 621, the second coupling groove 622, and the third coupling groove 623. The first to third coupling grooves 621, 622, and 623 may be recessed by predetermined distances into one side surface of the elastic member coupling part 620.

Accordingly, the elastic member 230 coupled to any one of the first to third coupling grooves 621, 622, and 623 cannot be arbitrarily moved to another coupling groove 621, 622, 623.

The first coupling groove 621 may be located at the uppermost side. That is, the first coupling groove 621 may be located closest to the instant bar body part 610.

The second coupling groove 622 may be located at a middle portion. That is, the second coupling groove 622 may be located between the first coupling groove 621 and the third coupling groove 623.

The third coupling groove 623 may be located at the lowermost side. That is, the third coupling groove 623 may be located farthest from the instant bar body part 610.

Accordingly, the elastic force stored in the elastic member 230 can be adjusted by rotating the instant bar 600. In addition, the elastic member 230 can be coupled to any one of the first to third coupling grooves 621, 622, and 623, so as to more precisely adjust the elastic force stored in the elastic member 230.

The movement limiting protrusion 630 may limit the movement distance of the crossbar 500 relative to the instant bar 600. As described above, the process can also be achieved by the contact between the elastic member coupling part 620 and the movement groove 518.

The movement limiting protrusion 630 may protrude by a predetermined length from the instant bar body part 610 toward the crossbar 500. When the instant bar 600 is coupled to the crossbar 500, the movement limiting protrusion 630 may be inserted through the movement limiting groove 514.

In the illustrated implementation, the movement limiting protrusion 630 may protrude from an upper surface of the instant bar body part 610. In addition, the movement limiting protrusion 630 may be located between two elastic member coupling parts 620 located at the leftmost side.

The position of the movement limiting protrusion 630 may change depending on the position of the movement limiting groove 514.

The movement limiting protrusion 630 may include a first portion 631 and a second portion 632.

The first portion 631 may protrude by a predetermined length from the instant bar body part 610 toward the crossbar 500 or the shooter 320 at a predetermined angle.

Accordingly, when the crossbar 500 and the instant bar 600 are separated through an opening communicating with the insertion space portion 513, the instant bar 600 must be rotated in a manner that the first portion 631 is not in contact with a surface surrounding the movement limiting groove 514.

That is, when the instant bar 600 is separated in a non-rotated state, one side of the first portion 631, namely, a rear surface in the illustrated implementation may be caught on the surface surrounding the movement limiting groove 514.

This can stably maintain the coupled state between the crossbar 500 and the instant bar 600.

The first portion 631 may come in contact with a movement limiting surface of surfaces surrounding the movement limiting groove 514. A movement distance of the crossbar 500 in the extending direction may be limited by the contact between the first portion 631 and the movement limiting surface.

The second portion 632 may extend from an end of the first portion 631.

The second portion 632 may extend from the end of the first portion 631 by a predetermined length. The second portion 632 may extend at a predetermined angle with the first portion 631. In one implementation, the predetermined angle may be an obtuse angle.

When the instant bar 600 is separated from the crossbar 500, the instant bar 600 must be rotated again after the first portion 631 is escaped from the movement limiting groove 514.

That is, the instant bar 600 must be rotated twice in order to be separated from the crossbar 500. This can further stably maintain the coupled state between the crossbar 500 and the instant bar 600.

(3) Description of Coupling Process Between Crossbar 500 and Instant Bar 600

The crossbar assembly 400 according to the implementation may be configured by rotatably coupling the crossbar 500 and the instant bar 600. The crossbar 500 and the instant bar 600 that are coupled to each other may be arranged to have the same central axis.

Accordingly, a space for rotation of the crossbar 500 and a space for rotation of the instant bar 600 can be integrated. As a result, a space required for the trip device 10 can be reduced, and thus a total volume of the trip device 10 and the circuit breaker having the same can be reduced.

Figure 16:
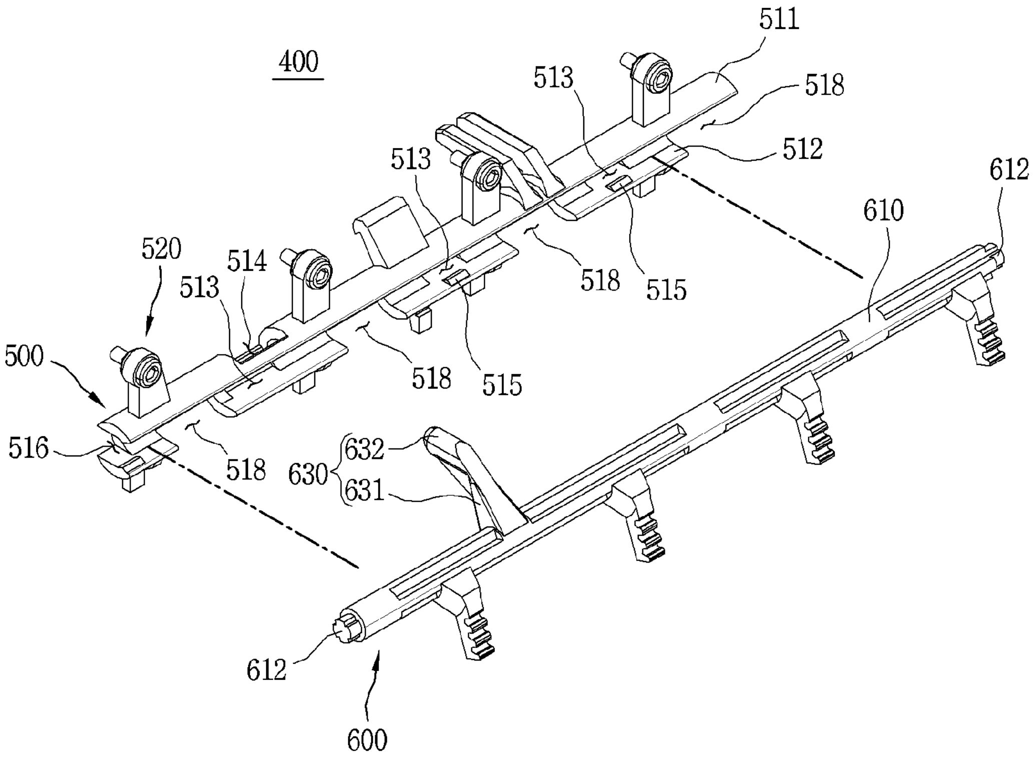
FIG. 16 is a perspective view illustrating a process in which the crossbar of FIG. 8 and the instant bar of FIG. 12 are coupled to each other.

Hereinafter, a process of configuring the crossbar assembly 400 according to the implementation will be described in detail, with reference to FIG. 16.

The instant bar body part 610 may be inserted into the insertion space portion 513.

At this time, the rotation shaft 612 may be inserted into the rotation shaft coupling portion 516 and supported by the rotation shaft support portion 517. In addition, the plurality of elastic member coupling parts 620 may be inserted into the plurality of movement grooves 518, respectively.

Meanwhile, the movement limiting protrusion 630 may include the first portion 631 and the second portion 632 that extend while forming a predetermined angle therebetween.

Accordingly, the instant bar body part 610 may be rotated so that the second portion 632 first inserted into the movement limiting groove 514 is inserted without being caught, and then the process of inserting the movement limiting protrusion 630 into the movement limiting groove 514 may be carried out.

Next, the first portion 631 may extend to have a different angle from the second portion 632. Accordingly, the instant bar body part 610 may be rotated again so that the first portion 631 is inserted without being caught, and then the process of inserting the movement limiting protrusion 630 into the movement limiting groove 514 may be carried out.

In addition, a distance between an end portion of the first body portion 511 and an end portion of the second body portion 512 that face each other may be smaller than a diameter of the instant bar body part 610.

Therefore, in order for the instant bar body part 610 to be inserted into the insertion space portion 513, shape deformation may be required to increase the distance between the end portion of the first body portion 511 and the end portion of the second body portion 512 that face each other. To this end, the first body portion 511 and the second body portion 512 may be formed of a material having a predetermined elasticity as described above.

That is, after the first body portion 511 and the second body portion 512 are opened by an external force, the instant bar 600 can be inserted into the insertion space portion 513.

On the other hand, the fixing jaw 515 may protrude from the inner surface of the second body portion 512. The fixing jaw 515 may press the instant bar body part 610 inserted into the insertion space portion 513 in a direction toward the center, thereby preventing an arbitrary separation of the instant bar body part 610.

Accordingly, the crossbar 500 and the instant bar 600 can be rotatably coupled to each other, thereby configuring the crossbar assembly 400. In one implementation, the crossbar 500 and the instant bar 600 may be fitted to each other as described above.

Although not illustrated, it will be understood that the crossbar 500 and the instant bar 600 can be separated by performing those processes in reverse when maintenance or the like is required. Therefore, it can be said that the crossbar 500 and the instant bar 600 are detachably coupled to each other.

4. Description of Process of Operating Crossbar Assembly 400 According to Implementation The crossbar assembly 400 according to the implementation may be configured by rotatably coupling the crossbar 500 and the instant bar 600. The crossbar 500 and the instant bar 600 may be arranged to have the same central axis, so as to integrate the spaces for the rotation of the crossbar 500 and the instant bar 600. Accordingly, the trip device 10 and the circuit breaker can be miniaturized.

In addition, the crossbar 500 may be coupled to the instant bar 600 to be movable in the extending direction. Accordingly, even if a separate metal bar member is not provided, the crossbar 500 can be moved in the extending direction to adjust the distance between the bimetal 310 and the contact member 521.

Hereinafter, a detailed description will be given of a process of operating the crossbar assembly 400 according to the implementation, with reference to FIGS. 17A to 19B.

FIGS. 17A to 18B illustrate a process in which the crossbar 500 is moved relative to the instant bar 600 in the extending direction. For the same of explanation, the side walls 110 of the frame 100 are not illustrated in FIGS. 17A and 17B.

Figure 17A:
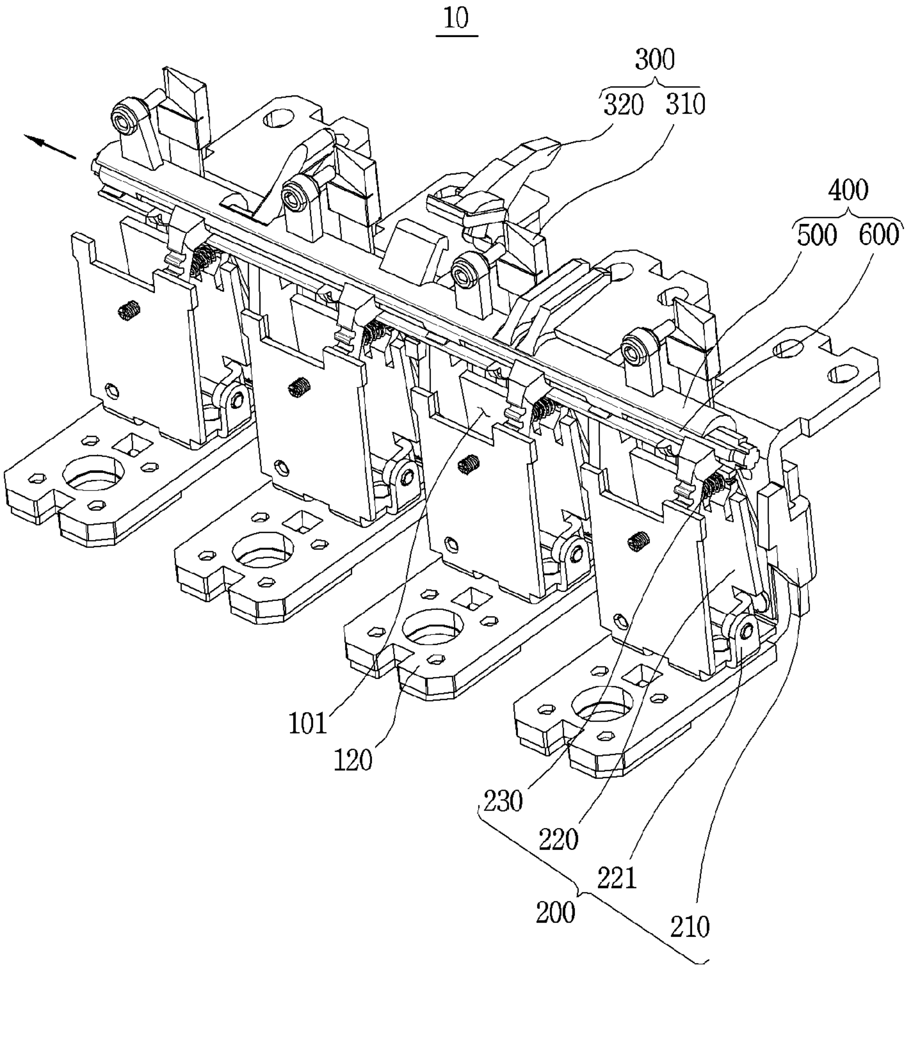
FIGS. 17A and 17B are perspective views illustrating a process of adjusting a trip interval in the trip device of FIG. 3.
Figure 18A:
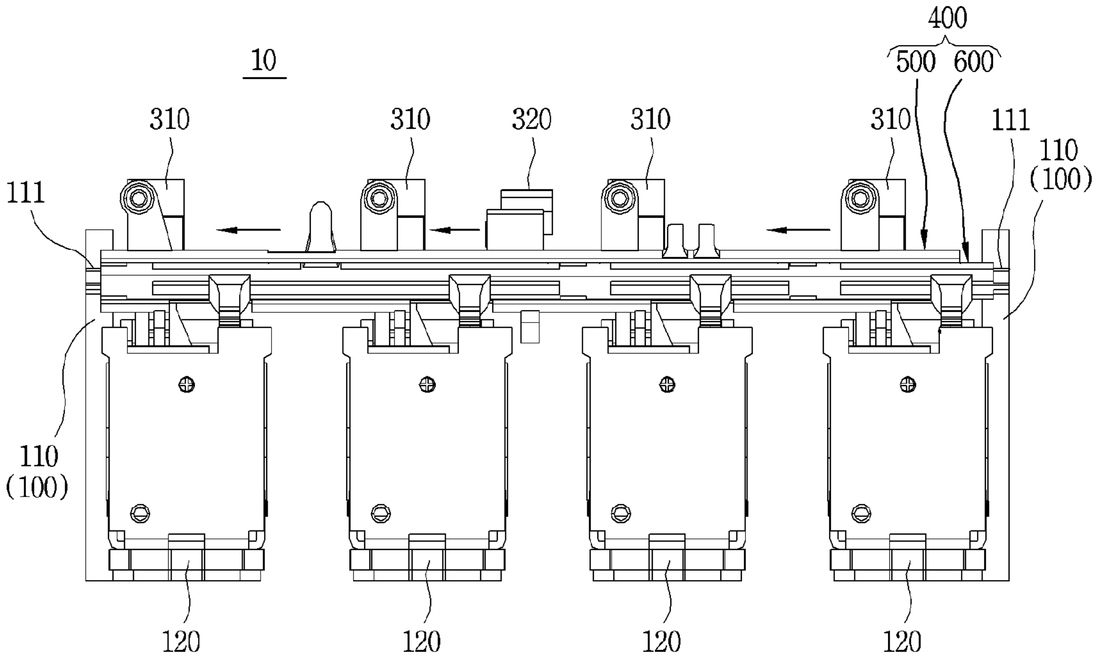
FIGS. 18A and 18B are front views illustrating a process of adjusting a trip interval in the trip device of FIG. 3.

Referring to FIGS. 17A and 18A, the crossbar 500 may be moved to the left relative to the instant bar 600. At this time, since the instant bar 600 is rotatably coupled to the side walls 110 by the rotation shafts 612, the instant bar 600 may not move in the direction.

When the crossbar 500 is moved, the bimetal contact part 520 may also be moved. In the illustrated implementation, the bimetal 310 may be inclined so as to be farther away from the bimetal contact part 520 toward the left.

Accordingly, as the crossbar 500 is moved to the left, the shortest distance between the bimetal 310 and the contact member 521 may be increased. This can allow adjustment of the trip section such that the magnitude of an overcurrent for performing a trip operation can be increased.

At this time, the movement limiting groove 514 may be moved to the left while the movement limiting protrusion 630 is stopped. Accordingly, when the crossbar 500 is continuously moved to the left, a surface surrounding the movement limiting groove 514 at the right side may be brought into contact with a right surface of the movement limiting protrusion 630.

Similarly, the movement groove 518 may be moved to the left while the elastic member coupling part 620 is stopped. Accordingly, when the crossbar 500 is continuously moved to the left, a left end of the second body portion 512 located at the left side of the movement groove 518 may be brought into contact with a right surface of the elastic member coupling part 620.

This can limit the distance by which the crossbar 500 is moved to the left. As a result, a degree to which the shortest distance between the bimetal 310 and the contact member 521 is increased can be limited.

Figure 17B:
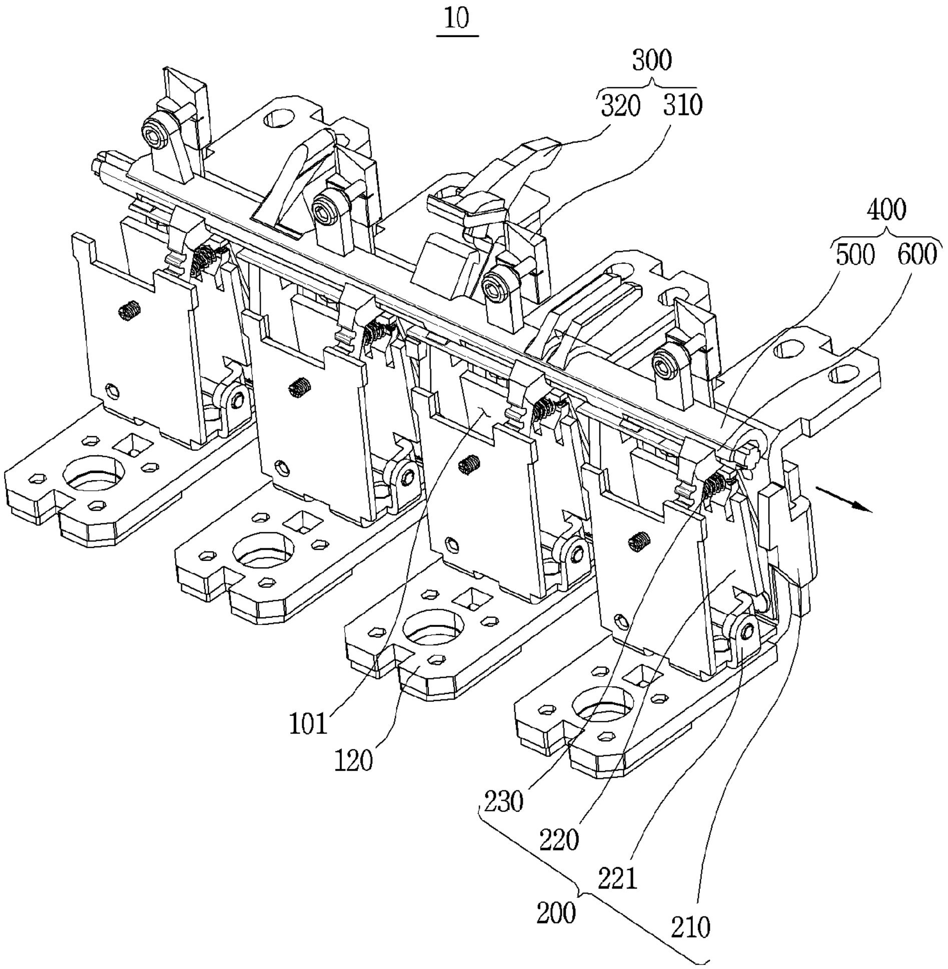
Figure 18B:
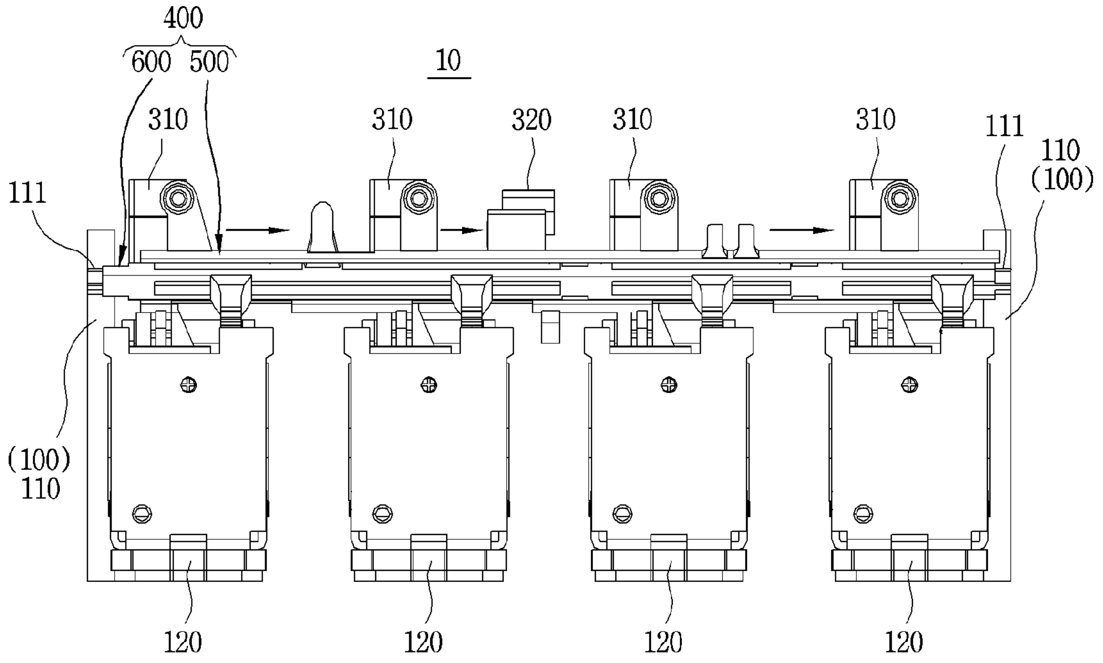

Referring to FIGS. 17B and 18B, the crossbar 500 may be moved to the right relative to the instant bar 600. In this case, the instant bar 600 may not be moved as described above.

When the crossbar 500 is moved, the bimetal contact part 520 may also be moved. In the illustrated implementation, the bimetal 310 may be inclined to be close to the bimetal contact part 520 toward the right.

Accordingly, as the crossbar 500 is moved to the right, the shortest distance between the bimetal 310 and the contact member 521 may be decreased. This can allow adjustment of the trip section such that the magnitude of an overcurrent for performing a trip operation can be decreased.

At this time, the movement limiting groove 514 may be moved to the right while the movement limiting protrusion 630 is stopped. Accordingly, when the crossbar 500 is continuously moved to the right, a surface surrounding the movement limiting groove 514 at the left side may be brought into contact with a left surface of the movement limiting protrusion 630.

Similarly, the movement groove 518 may be moved to the right while the elastic member coupling part 620 is stopped. Accordingly, when the crossbar 500 is continuously moved to the right, a right end of the second body portion 512 located at the right side of the movement groove 518 may be brought into contact with a left surface of the elastic member coupling part 620.

This can limit the distance by which the crossbar 500 is moved to the right. As a result, a degree to which the shortest distance between the bimetal 310 and the contact member 521 is increased can be limited.

Referring to FIGS. 19A and 19B, a process in which the crossbar 500 is rotated and the shooter 320 is released is illustrated. It will be understood that the process can be applied to both the case where the armature 220 is moved toward the electromagnet 210 due to a generation of a fault current and the case where the bimetal 310 hits the contact member 521 due to a generation of an overcurrent.

Referring to FIG. 19A, the shooter hook portion 321 and the contact hook portion 541 may be in contact with each other. The shooter 320 may be in a state of receiving an elastic force for rotation in a clockwise direction, but the rotation may be restricted by the shooter contact part 540.

It will be understood that the crossbar 500 and the instant bar 600 are arranged to have the same rotation shaft.

In this case, the shooter hook portion 321 may be located between the shooter contact part 540 and the contact hook portion 541. Also, the contact hook portion 541 may be located between the shooter 320 and the shooter hook portion 321. That is, the shooter hook portion 321 and the contact hook portion 541 may be hooked onto each other.

Accordingly, unless an external force is applied, the shooter 320 may not be arbitrarily released.

Referring to FIG. 19B, the shooter hook portion 321 and the contact hook portion 541 may be in a spaced state from each other. That is, the crossbar 500 may be in a rotated state due to a generation of a fault current or an overcurrent. The crossbar 500 may be rotated away from the shooter 320, that is, counterclockwise.

In this case, the crossbar 500 and the instant bar 600 may be coupled to be relatively rotatable. Accordingly, although the crossbar 500 is rotated, the instant bar 600 may not be rotated. That is, the state of FIG. 19A may be maintained.

As the crossbar 500 is rotated, the shooter 320 may be released and rotated clockwise. Accordingly, the shooter 320 can hit the trip mechanism (not illustrated) to perform a trip operation.

Although it has been described above with reference to the preferred implementations of the present disclosure, it will be understood that those skilled in the art are able to variously modify and change the present disclosure without departing from the scope of the invention described in the claims below.

10: Trip device
100: Frame
101: Space portion
110: Side wall
111: Rotation shaft insertion portion
120: Heater member
200: Driving unit
210: Electromagnet
220: Armature
221: Hinge member
230: Elastic member
300: Operation unit
310: Bimetal
320: Shooter
321: Shooter hook portion
322: Shooter rotation shaft
400: Crossbar assembly
500: Crossbar
510: Crossbar body part
511: First body portion
512: Second body portion
513: Insertion space portion
514: Movement limiting groove
515: Fixing jaw
516: Rotation shaft coupling portion
517: Rotation shaft support portion
518: Movement groove
520: Bimetal contact part
521: Contact member
522: Support member
522*a*: Contact member insertion hole
530: Knob coupling portion
531: First extension portion
532: Second extension portion
533: Knob insertion space portion
540: Shooter contact part
541: Contact hook portion
600: Instant bar
610: Instant bar body part
611: Weight-reducing groove
612: Rotation shaft
620: Elastic member coupling part
621: First coupling groove
622: Second coupling groove
623: Third coupling groove
630: Movement limiting protrusion
631: First portion
632: Second portion
1000: Trip device according to the related art
1100: Shooter
1110: Shooter hook
1200: Crossbar
1210: Crossbar hook
1300: Instant bar
1400: Magnetic part
1410: Electromagnet
1420: Armature
1500: Bimetal
1600: Dial

The invention claimed is:

1. A crossbar assembly comprising:

a crossbar extending in one direction, and configured to rotate in response to an overcurrent flowing in a circuit associated with a circuit breaker in which the crossbar assembly is disposed to perform a trip operation of the circuit breaker; and an instant bar extending in the one direction and rotatably coupled to the crossbar, and configured to rotate independently of rotation of the crossbar in response to a fault current flowing in the circuit to perform the trip operation, wherein the crossbar comprises:

an insertion space portion formed through an inside of the crossbar in the one direction, accommodating the instant bar, and having one side facing the instant bar open;

a first body portion extending in the one direction and surrounding a part of the insertion space portion; and a second body portion extending in the one direction and surrounding another part of the insertion space portion.

2. The crossbar assembly of claim 1, wherein each of the first body portion and the second body portion has an arcuate cross-section, and wherein one end portion of the first body portion in an arcuate direction and one end portion of the second body portion in the arcuate direction are spaced apart from each other at the one side at which the insertion space portion is open.

3. The crossbar assembly of claim 2, wherein the cross-section of the first body portion and the cross-section of the second body portion are formed in an arcuate shape having the same center.

4. The crossbar assembly of claim 2, wherein the instant bar comprises an instant bar body part extending in the one direction, rotatably inserted into the insertion space portion, and having a rounded outer circumferential surface, and wherein the instant bar body part is formed such that a minimum distance from a central axis in the extending direction to the outer circumferential surface is longer than a distance between the one end portion of the first body portion and the one end portion of the second body portion.

5. The crossbar assembly of claim 4, wherein the first body portion of the crossbar comprises a movement limiting groove formed therethrough and extending by a predetermined length in the one direction, and wherein the instant bar body part facing the crossbar comprises a movement limiting protrusion protruding from one side thereof toward the crossbar and inserted through the movement limiting groove.

6. The crossbar assembly of claim 5, wherein the movement limiting protrusion comprises:

a first portion extending from the outer circumferential surface of the one side of the instant bar body part to form a predetermined angle with the outer circumferential surface of the one side; and a second portion extending from an end of the first portion to form a predetermined angle with the first portion.

7. The crossbar assembly of claim 1, wherein the instant bar is coupled to the crossbar to be movable in the one direction.

8. The crossbar assembly of claim 7, wherein an extended length of the instant bar is shorter than an extended length of the crossbar.

9. A trip device comprising:

a frame with an inner space;

a shooter rotatably coupled to the frame; and a crossbar assembly rotatably coupled to the frame to be brought into contact with or separated from the shooter, wherein the crossbar assembly comprises:

a crossbar extending in one direction and including an insertion space portion formed through an inside thereof in the one direction, and configured to rotate in response to an overcurrent flowing in a circuit associated with the trip device to perform a trip operation of the trip device; and an instant bar extending in the one direction and rotatably coupled to the insertion space portion of the crossbar, and configured to rotate independently of the crossbar in response to a fault current flowing in the circuit to perform the trip operation.

10. The trip device of claim 9, wherein the instant bar comprises a rotation shaft located on each end portion of the instant bar in the extending direction and rotatably coupled to the frame.

11. The trip device of claim 9, wherein the crossbar comprises:

a shooter contact part protruding toward the shooter; and a contact hook portion extending from an end portion of the shooter contact part toward the shooter while forming a predetermined angle with the shooter contact part, and wherein the shooter comprises a shooter hook portion brought into contact with the contact hook portion and extending toward the shooter contact part.

12. The trip device of claim 9, wherein the crossbar comprises:

a first body portion extending in the one direction and surrounding a part of the insertion space portion; and a second body portion extending from the first body portion in the one direction and surrounding another part of the insertion space portion, and wherein the second body portion extends to be shorter than the first body portion, and is provided in plurality, the plurality of second body portions being spaced apart from one another by predetermined distances.

13. The trip device of claim 12, wherein the instant bar comprises an elastic member coupling part having a coupling groove to which an elastic member is coupled, and protruding from the instant bar, and wherein the elastic member coupling part is inserted into a movement groove that is a space defined between the plurality of second body portions.

14. The trip device of claim 13, wherein the instant bar is coupled to the crossbar to be movable relative to the crossbar in the one direction or in another direction opposite to the one direction, and wherein the elastic member coupling part is moved in the one direction or the another direction between an end portion in the one direction of any one second body portion of adjacent second body portions and an end portion in another direction of the second body portion.

15. The trip device of claim 9, wherein the crossbar comprises a movement limiting groove formed through an outer circumferential surface thereof by a predetermined distance in the one direction in which the crossbar extends, and wherein the instant bar comprises a movement limiting protrusion protruding toward the movement limiting groove and coupled through the movement limiting groove.

* * * * *